(12) United States Patent
Rajendran et al.

(10) Patent No.: US 10,574,830 B2
(45) Date of Patent: Feb. 25, 2020

(54) METHODS FOR INCREASING VOIP NETWORK COVERAGE

(71) Applicant: QUALCOMM Incorporated, San Diego, CA (US)

(72) Inventors: Vivek Rajendran, San Diego, CA (US); Nikolai Konrad Leung, San Francisco, CA (US); Min Wang, San Diego, CA (US); Venkatraman Atti, San Diego, CA (US)

(73) Assignee: QUALCOMM Incoporated, San Diego, CA (US)

( * ) Notice: Subject to any disclaimer, the term of this patent is extended or adjusted under 35 U.S.C. 154(b) by 123 days.

(21) Appl. No.: 15/954,587

(22) Filed: Apr. 16, 2018

(65) Prior Publication Data

US 2018/0352092 A1 Dec. 6, 2018

Related U.S. Application Data

(60) Provisional application No. 62/515,342, filed on Jun. 5, 2017, provisional application No. 62/567,613, filed
(Continued)

(51) Int. Cl.
| | |
|---|---|
| *H04M 7/00* | (2006.01) |
| *H04W 36/00* | (2009.01) |
| *H04W 24/08* | (2009.01) |

(52) U.S. Cl.
CPC ......... *H04M 7/0072* (2013.01); *H04W 24/08* (2013.01); *H04W 36/0094* (2013.01)

(58) Field of Classification Search
None
See application file for complete search history.

(56) References Cited

U.S. PATENT DOCUMENTS

| | | | | |
|---|---|---|---|---|
| 7,251,241 B1* | 7/2007 | Jagadeesan | ....... | H04L 29/06027 370/352 |
| 2008/0317065 A1* | 12/2008 | Chen | ................... | H04M 7/0072 370/469 |

(Continued)

OTHER PUBLICATIONS

Qualcomm Incorporated: "EVoLP: The Robustness Index," S4-170263, 3GPP TSG-SA4 Meeting #93, Busan, South Korea, Apr. 24-28, 2017, pp. 1-2.

(Continued)

*Primary Examiner* — Saba Tsegaye
(74) *Attorney, Agent, or Firm* — Muncy, Geissler, Olds & Lowe, P.C.

(57) ABSTRACT

The disclosure generally relates to various methods to increase network coverage with respect to Voice-over-Internet Protocol (VoIP) sessions and/or other voice-based multimedia services. In particular, when establishing a voice session, two or more terminals may perform a codec negotiation to exchange information related to supported multimedia codecs and/or codec modes, jitter buffer management (JBM), and packet loss concealment (PLC) capabilities. Based on the exchanged information, a message may be sent to a base station to indicate the maximum packet loss rate (PLR) for each terminal. Additional techniques may ensure that the terminals use the most robust codecs or codec modes that are available when nearing the edge of coverage to help avoid unnecessary and/or excessive handovers to different radio access technologies.

62 Claims, 9 Drawing Sheets

Related U.S. Application Data on Oct. 3, 2017, provisional application No. 62/651,045, filed on Mar. 30, 2018.

(56) References Cited

U.S. PATENT DOCUMENTS

2011/0141890 A1*   6/2011   Giaretta ................ H04W 28/20
                                                    370/232
2013/0215774 A1    8/2013   Bender et al.

OTHER PUBLICATIONS

Qualcomm Incorporated: "On eNB Awareness of EVS Codec for Coverage and mobility Enhancements," R2-165194, 3GPP TSG-RAN2 meeting #95, Gothenburg, Sweden, Aug. 22-26, 2016, pp. 1-11.
International Search Report and Written Opinion—PCT/US2018/028333—ISA/EPO—dated Jul. 13, 2018.

* cited by examiner

METHODS FOR INCREASING VOIP NETWORK COVERAGE

CROSS-REFERENCE TO RELATED APPLICATIONS

The present application claims the benefit of U.S. Provisional Application No. 62/515,342, entitled "METHODS FOR INCREASING VOIP NETWORK COVERAGE," filed Jun. 5, 2017, U.S. Provisional Application No. 62/567,613, entitled "METHODS FOR INCREASING VOIP NETWORK COVERAGE," filed Oct. 3, 2017, and U.S. Provisional Application No. 62/651,045, entitled "METHODS FOR INCREASING VOIP NETWORK COVERAGE," filed Mar. 30, 2018, which are each assigned to the assignee hereof, and the contents of which are each hereby expressly incorporated by reference in their entirety.

TECHNICAL FIELD

The various aspects and embodiments described herein generally relate to wireless communications, and in particular, to increasing network coverage for Voice-over-Internet Protocol (VoIP) sessions and/or other voice-based multimedia services.

BACKGROUND

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high-speed data and Internet-capable wireless services. There are many wireless communication systems in use, including Cellular and Personal Communications Service (PCS) systems. Exemplary cellular systems include the cellular Analog Advanced Mobile Phone System (AMPS), digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies. More recently, Long Term Evolution (LTE) has been developed as a wireless communications protocol for mobile phones and other terminals to communicate data at high speeds. LTE is based on GSM, and includes contributions from various GSM-related protocols such as Enhanced Data rates for GSM Evolution (EDGE) and Universal Mobile Telecommunications System (UMTS) protocols such as High-Speed Packet Access (HSPA).

The fifth generation (5G) mobile standard is currently being formulated and calls for higher data transfer speeds, greater numbers of connections, and better coverage, among other improvements. The 5G standard, according to the Next Generation Mobile Networks Alliance, is expected to provide data rates of several tens of megabits per second to each of tens of thousands of users, with one gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, the disclosure generally relates to various methods to increase network coverage with respect to Voice-over-Internet Protocol (VoIP) sessions and/or other voice-based multimedia services. In particular, when establishing a voice session, two or more terminals may perform a codec negotiation to exchange information related to supported multimedia codecs and/or codec modes, jitter buffer management (JBM), and packet loss concealment (PLC) capabilities. Based on the exchanged information, a message may be sent to a base station to indicate the maximum packet loss rate (PLR) for each terminal. Additional techniques may ensure that the terminals use the most robust codecs or codec modes that are available when nearing the edge of coverage to help avoid unnecessary and/or excessive handovers.

For example, according to various aspects, a method for increasing network coverage for a VoIP session between a first user equipment (UE) and a second UE may comprise negotiating, between the first UE and the second UE, a codec configuration to use in the VoIP session between the first UE and the second UE, determining, at the first UE, maximum end-to-end PLRs that the first UE and the second UE can tolerate for received media based at least in part on the negotiated codec configuration, determining, at the first UE, a distribution of the maximum end-to-end PLRs among respective uplinks and downlinks at the first UE and the second UE, and transmitting, by the first UE to a serving base station, a message to request an uplink PLR for media transmitted in a direction from the first UE to the second UE and a downlink PLR for media transmitted in a direction from the second UE to the first UE according to the determined distribution. Furthermore, in various embodiments, the maximum end-to-end PLRs may be further based on respective PLC and JBM implementations in use at the first UE and the second UE. In one aspect, determining the maximum end-to-end PLRs that the first UE and the second UE can tolerate for received media may comprise transmitting, by the first UE to the second UE, the maximum end-to-end PLR that the first UE can tolerate for received media given the negotiated codec configuration and receiving, at the first UE from the second UE, the maximum end-to-end PLR that the second UE can tolerate for received media given the negotiated codec configuration. In one aspect, the serving base station may be configured to establish a handover threshold for the VoIP session (e.g., a Single Radio Voice Call Continuity (SRVCC) threshold) based at least in part on the requested uplink PLR and the requested downlink PLR.

According to various aspects, another method for increasing network coverage for a VoIP session between a first UE and a second UE may comprise monitoring, by a network element serving the first UE, a codec configuration negotiation between the first UE and the second UE, wherein the codec configuration negotiation includes an exchange of maximum end-to-end PLRs that the first UE and the second UE can tolerate for received media based at least in part on the negotiated codec configuration, wherein the maximum end-to-end PLRs may be further based on respective PLC and JBM implementations in use at the first UE and the second UE, determining, by the network element, an agreed-upon distribution of the maximum end-to-end PLRs among respective uplinks and downlinks at the first UE and the second UE, and transmitting, by the network element to a base station serving the first UE, a message to request an uplink PLR for media transmitted in a direction from the first UE to the second UE and a downlink PLR for media transmitted in a direction from the second UE to the first UE according to the agreed-upon distribution. The base station serving the first UE may therefore be configured to establish a handover threshold for the VoIP session (e.g., a Single Radio Voice Call Continuity (SRVCC) threshold) based at least in part on the requested uplink PLR and the requested downlink PLR.

According to various aspects, in the above methods, the distribution of the maximum end-to-end PLRs among the respective uplinks and downlinks may comprise an agreed-upon ratio (R) representing an uplink PLR-to-downlink PLR ratio. In such cases, the uplink PLR and the downlink PLR to request from the serving base station may be calculated (e.g., by the requesting UE or the requesting network element) according to the agreed-upon ratio (R) such that the requested uplink PLR is equal to the maximum end-to-end PLR that the second UE can tolerate for received media multiplied by $R/(R+1)$, and such that the requested downlink PLR is equal to the maximum end-to-end PLR that the first UE can tolerate for received media multiplied by $1/(R+1)$. In one alternative aspect, the first UE and the second UE may be configured to determine the distribution of the maximum end-to-end PLRs among the respective uplinks and downlinks via Session Description Protocol (SDP) such that the uplink PLR requested from the serving base station is less than or equal to a difference between the maximum end-to-end PLR that the second UE can tolerate for received media and a downlink PLR that the second UE requests from a serving base station associated therewith, and such that the downlink PLR requested from the serving base station is less than or equal to a difference between the maximum end-to-end PLR that the first UE can tolerate for received media and an uplink PLR that the second UE requests from the serving base station associated therewith.

According to various aspects, the network element may negotiate the agreed-upon distribution of the maximum end-to-end PLRs among the respective uplinks and downlinks with a network element serving the second UE via Session Description Protocol (SDP), which may comprise receiving, at the network element, an SDP offer transmitted by the first UE that indicates the maximum end-to-end PLR that the first UE can tolerate for received media, determining, at the network element based on operator policy, a proportion of the maximum end-to-end PLR that the first UE can tolerate for received media to allocate to the downlink to the first UE from the base station serving the first UE, determining, at the network element based on the operator policy, a preferred PLR for the uplink from the first UE to the base station serving the first UE, modifying, by the network element, the SDP offer to indicate the determined proportion to allocate to the downlink to the first UE and the preferred PLR for the uplink from the first UE, and transmitting, by the network element, the modified SDP offer to a network element serving the second UE. The network element may then receive an SDP answer that includes a proposed uplink PLR for the second UE from the network element serving the second UE and accept or reject the SDP answer depending on whether the proposed uplink PLR for the second UE is less than or equal to a difference between the maximum end-to-end PLR that the first UE can tolerate for received media and the proportion of the maximum end-to-end PLR allocated to the downlink to the first UE.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
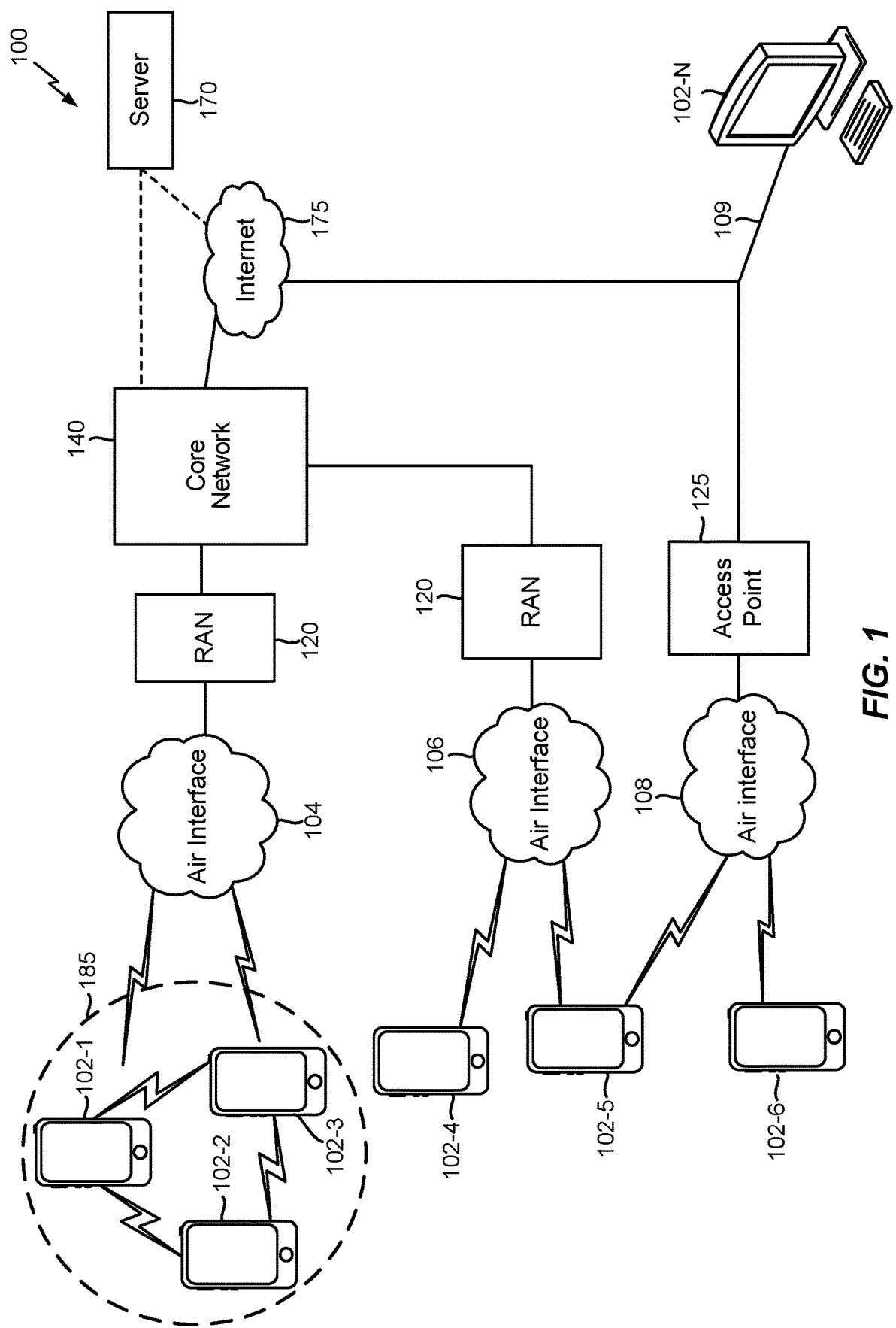
FIG. 1 illustrates a high-level system architecture of a wireless communications system that may support voice-based multimedia services, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

The techniques described herein may be used in connection with various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE, and GSM are described in documents from the "3rd Generation Partnership Project" (3GPP). CDMA2000 and UMB are described in documents from an organization named "3rd Generation Partnership Project 2" (3GPP2). For clarity, certain aspects are described below for LTE, and LTE terminology may be used in much of the description below.

As used herein, the terms "user device," "user equipment" (or "UE"), "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device. Accordingly, the above-mentioned terms may suitably refer to any one or all of cellular telephones, smart phones, personal or mobile multimedia players, personal data assistants, laptop computers, personal computers, tablet computers, smart books, palm-top computers, wireless electronic mail receivers, multimedia Internet-enabled cellular telephones, wireless gaming controllers, and similar devices with a programmable processor, memory, and circuitry to connect to and communicate over a radio access network (RAN) that implements a particular radio access technology (RAT), over a wired network, over a wireless local area network (WLAN) (e.g., based on IEEE 802.11, etc.), and/or with other devices via a direct device-to-device (D2D) or peer-to-peer (P2P) connection.

According to various aspects, a communication link through which one or more UEs can send signals to the RAN, the wired network, the WLAN, etc. is called an uplink or reverse link channel (e.g., a reverse traffic channel, a reverse control channel, an access channel, etc.), while a communication link through which the RAN, the wired network, the WLAN, etc. can send signals to UEs is called a downlink or forward link channel (e.g., a paging channel, a control channel, a broadcast channel, a forward traffic channel, etc.). As used herein the term traffic channel (TCH) can refer to either an uplink/reverse link channel or a downlink/forward link channel.

According to various aspects, FIG. 1 illustrates a high-level system architecture of a wireless communications system 100 that may support voice-based multimedia services. In various embodiments, the wireless communications system 100 may contain various UEs, including UE 102-1, UE 102-2, UE 102-3, UE 102-4, UE 102-5, 102-6, UE 102-N, collectively referred to herein as UEs 102-1 . . . N. The UEs 102-1 . . . N can include cellular telephones, smart phones, personal or mobile multimedia players, personal data assistants, laptop computers, personal computers, tablet computers, and so on. For example, in FIG. 1, UE 102-1 . . . 6 are illustrated as cellular touchscreen phones or smart phones and UE 102-N is illustrated as a desktop computer.

Referring to FIG. 1, the UEs 102-1 . . . N may communicate with an access network (e.g., RAN 120, an access point 125, etc.) over a physical communications interface or layer, shown in FIG. 1 as air interfaces 104, 106, 108 and/or a direct or indirect wired connection 109. The air interfaces 104 and 106 can comply with a given cellular communications protocol (e.g., CDMA, EV-DO, eHRPD, GSM, EDGE, W-CDMA, LTE, etc.), while the air interface 108 can comply with a wireless local area network (WLAN) protocol (e.g., IEEE 802.11). Although not explicitly shown in FIG. 1, the RAN 120 may include various access points that can serve UEs over air interfaces, such as the air interfaces 104 and 106. Each access point in the RAN 120 can be referred to as an access node or AN, an access point or AP, a base station or BS, a Node B, an evolved Node B, an eNodeB or eNB, and so on. These access points can be terrestrial access points (or ground stations) or satellite access points. The RAN 120 may be configured to connect to a core network 140 that can perform various functions, including bridging calls (e.g., voice calls) between UEs serviced via the RAN 120 and other UEs serviced via the RAN 120 or an altogether different RAN.

In various embodiments, the RAN 120 may be configured to bridge circuit-switched (CS) calls between UEs serviced via the RAN 120 and other UEs serviced via the RAN 120 or an altogether different RAN. In various embodiments, the RAN 120 may also be configured to mediate an exchange of packet-switched (PS) data with external networks such as Internet 175. The Internet 175 may generally include various routing agents and processing agents (not explicitly shown in FIG. 1 for sake of convenience). In FIG. 1, UE 102-N is shown as connecting to the Internet 175 via the wired connection 109 (i.e., separate from the core network 140, such as over an Ethernet connection to an 802.11-based wireless local area network). The Internet 175 can thereby bridge packet-switched data communications (including data associated with voice calls) between UE 102-N and UEs 102-1 to 102-6 via the core network 140. Also shown in FIG. 1 is the access point 125 separate from the RAN 120. The access point 125 may connect to the Internet 175 independent from the core network 140 (e.g., via an optical communication system, a cable modem, etc.). The air interface 108 may serve UE 102-5 or UE 102-6 over a local wireless connection, such as IEEE 802.11 in an example. UE 102-N is shown as a desktop computer with the wired connection 109 to the Internet 175, such as a direct connection to a modem or router, which can correspond to the access point 125 itself in one example (e.g., a WLAN router with wired and/or wireless connectivity may correspond to the access point 125).

Referring to FIG. 1, a server 170 is shown as connected to the Internet 175, the core network 140, or both. The server 170 can be implemented as multiple structurally separate servers or alternately as a single server. The server 170 may correspond to any suitable type of server, such as a web server (e.g., hosting a web page), an application download server, or an application server configured to support one or more communication services for UEs that can connect to the server 170 via the core network 140 and/or the Internet 175 (e.g., Voice-over-Internet Protocol (VoIP) sessions, Voice-over-LTE (VoLTE) sessions, Push-to-Talk (PTT) sessions, group communication sessions, sessions that involve Video-over-LTE (ViLTE) or other suitable video call services, Rich Communication Services (RCS), social networking services, etc.).

Referring to FIG. 1, UEs 102-1, 102-2, and 102-3 are depicted as part of a D2D network or D2D group 185, with UEs 102-1 and 102-3 being connected to the RAN 120 via the air interface 104. In an embodiment, UE 102-2 may also gain indirect access to the RAN 120 via mediation by UEs 102-1 and/or 102-3, whereby data 'hops' to/from UE 102-2 and one (or more) of UEs 102-1 and 102-3, which may communicate with the RAN 120 on behalf of UE 102-2.

According to various aspects, one example protocol-specific implementation for the RAN 120 and the core network 140 is provided below with respect to FIG. 2 to help explain the wireless communications system 100 in more detail. Furthermore, in the following description, the components of the RAN 120 and the core network 140 may be described with reference to functions that relate to supporting packet-switched (PS) communications that can be used in a voice-based multimedia session. However, those skilled in the art will appreciate that legacy circuit-switched (CS) components may be present though not explicitly shown in FIG. 2 or otherwise described at length herein.

Figure 2:
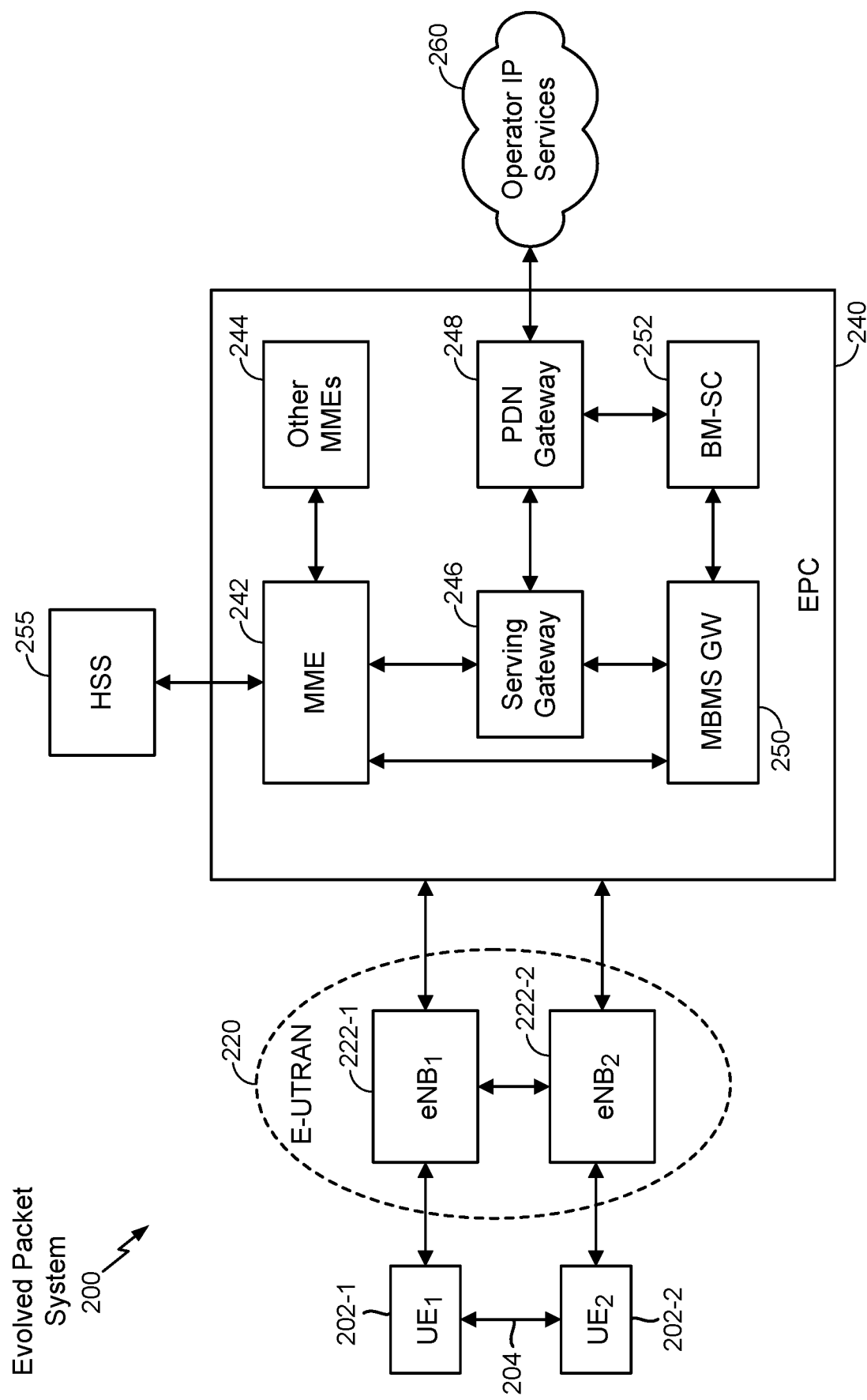
FIG. 2 illustrates an exemplary wireless network architecture that may support voice-based multimedia services, according to various aspects.

According to various aspects, FIG. 2 illustrates an exemplary wireless network architecture 200 that may support voice-based sessions between a first UE 202-1 and a second UE 202-2. In various embodiments, the wireless network architecture 200 may comprise a Long Term Evolution (LTE) (or Evolved Packet System (EPS)) network architecture 200. In various embodiments, the wireless network architecture 200 may include an Evolved UMTS Terrestrial Radio Access Network (E-UTRAN) 220, an Evolved Packet Core (EPC) 240, a Home Subscriber Server (HSS) 255, and Operator Internet Protocol (IP) Services 260 associated with an operator (e.g., a mobile network operator (MNO)). The EPS network architecture 200 can interconnect with other access networks and core networks (not shown), such as a UMTS access network or an IP core network. As shown, the EPS network architecture 200 provides packet-switched services; however, those skilled in the art will readily appreciate that the various concepts disclosed herein may be extended to networks that provide circuit-switched services.

In various embodiments, the E-UTRAN 220 may include a first eNode B (eNB) 222-1 in communication with UE 202-1 and a second eNB (eNB) 222-2 in communication with UE 202-2. The eNBs 222-1, 222-2 may provide user and control plane protocol terminations toward the UEs 202-1, 202-2 and may be connected to each other via a backhaul (e.g., an X2 interface). The eNBs 222-1, 222-2 may also be referred to as base stations, Node Bs, access points, base transceiver stations, radio base stations, radio transceivers, transceiver functions, a basic service set (BSS), an extended service set (ESS), or some other suitable terminology. The eNBs 222-1, 222-2 each provide an access point to the EPC 240 for the respective UEs 202-1, 202-2.

The eNBs 222-1, 222-2 may each connect to the EPC 240 via an Si interface, wherein the EPC 240 may include a Mobility Management Entity (MME) 242, other MMEs 244, a Serving Gateway 246, a Multimedia Broadcast Multicast Service (MBMS) Gateway 250, a Broadcast Multicast Service Center (BM-SC) 252, and a Packet Data Network (PDN) Gateway 248. The MME 242 is the control node that processes the signaling between the UEs 202-1, 202-2 and the EPC 240. Generally, the MME 242 provides bearer and connection management. All user IP packets are transferred through the Serving Gateway 246, which may be connected to the PDN Gateway 248. The PDN Gateway 248 provides UE IP address allocation as well as other functions. The PDN Gateway 248 is connected to the Operator IP Services 260, which may include the Internet, an intranet, an IP Multimedia Subsystem (IMS), and a PS Streaming Service (PSS). The BM-SC 252 may provide functions for MBMS user service provisioning and delivery. The BM-SC 252 may serve as an entry point for content provider MBMS transmission, may be used to authorize and initiate MBMS Bearer Services within a PLMN, and may be used to schedule and deliver MBMS transmissions. The MBMS Gateway 250 may be used to distribute MBMS traffic to the eNBs (e.g., 222-1, 222-2) belonging to a Multicast Broadcast Single Frequency Network (MBSFN) area broadcasting a particular service, and may be responsible for session management (start/stop) and for collecting eMBMS related charging information.

In various embodiments, a UE pair (e.g., UE 202-1 and UE 202-2) may establish a device-to-device (D2D) connection 204 to communicate directly without utilizing the respective eNBs 222-1, 222-2. The UE pair 202-1, 202-2 may then transfer data traffic over the D2D connection 204. In general, one or more entities in the network infrastructure (e.g., eNBs 222-1, 222-2, entities in the EPC 240, etc.) may coordinate the D2D communication between the UEs 202-1, 202-2, in that the network entities may assist in establishing the D2D connection 204, control use in a D2D mode versus a legacy mode, provide security support, etc. In various embodiments, the UE pair 202-1, 202-2 may be configured establish the D2D connection 204 autonomously, wherein initial discovery and establishing the D2D connection 204 may be based on an ability to communicate signals directly therebetween.

When terminals or UEs supporting multimedia (e.g., speech) services reach the edge of network coverage (e.g., the edge of a wireless wide area network (WWAN) such as an LTE network), the network typically examines a handover threshold and decides whether to handoff the terminal to a different radio access technology based on measurement reports from the terminal. For example, although LTE networks were initially deployed to support data services rather than voice-based services, LTE networks have evolved to increasingly support VoLTE and other voice-based services. However, uplink coverage in certain networks (e.g., LTE networks) tends to be limited or at least more limited than downlink coverage. Accordingly, one issue that arises is that the uplink coverage from the terminal to the eNB at the network edge tends to be weak (e.g., resulting in a higher packet loss rate (PLR) or block error rate (BLER)). Accordingly, to make packet-switched voice calls on LTE networks interoperable with existing networks, a Single Radio Voice Call Continuity (SRVCC) threshold is defined to hand over VoLTE calls to circuit-switched networks to avoid further degradation in the voice service due to increased packet loss. In other scenarios (e.g., handoff from an LTE network to a WLAN, handoff from a 5G NR network to an LTE network), the terminal examines the handover threshold and decides when to handoff, although the principle is generally the same in that the handover threshold is defined to avoid degradation in voice service due to packet loss. In other scenarios, the handover could also be from one radio cell to an adjacent radio cell with similar radio access technologies.

In general, the handover threshold (e.g., the SRVCC threshold) can therefore vary, even from one UE to another, as the effect of packet loss on the voice service may depend on various factors, including the multimedia codec or codec mode that the voice service is using, the packet loss concealment (PLC) algorithms implemented at the receiving UE(s), and the jitter (or de-jitter) buffer management (JBM) implementation in use at the receiving UE(s). For example, one multimedia codec that can be used is the Adaptive Multi-Rate (AMR) audio codec, which uses link adaptation to select from one of eight different bit rates based on link conditions and is generally used in circuit-switched networks. Adaptive Multi-Rate Wideband (AMR-WB) is similar to the AMR codec except that AMR-WB provides improved speech quality due to a wider speech bandwidth compared to the AMR audio codec. Enhanced Voice Services (EVS), as described in 3GPP TS 26.441, offers greater robustness than AMR and AMR-WB and also offers a Channel-Aware mode that includes partial redundancy based packet loss concealment mechanisms resulting in improved quality/intelligibility relative to EVS non-channel-aware modes or AMR/AMR-WB. As such, the various aspects and embodiments described herein generally contemplate a hierarchy in which the AMR audio codec is less robust than AMR-WB, which in turn is less robust than the EVS codec, while EVS Channel-Aware mode may be the most robust relative to AMR, AMR-WB, and EVS. However, those skilled in the art will appreciate that the other possible audio codecs may be included in the hierarchy, possibly also including future-developed audio codecs that offer greater robustness than EVS Channel-Aware mode. Accordingly, the hierarchy in which EVS Channel-Aware mode is the most robust and AMR is the least robust is described herein for illustrative purposes only and is not intended to be limiting in any way.

Furthermore, PLC algorithms such as zero insertion, waveform substitutions, model-based methods, and so on generally mask the effects of packet loss in VoIP communications. This is because voice signals are sent over a network in packets that may travel different routes to a destination and consequently arrive late, corrupted, out-of-order, or not at all. Relatedly, because packets may arrive at a decoder out-of-order or with random jitters in arrival time, JBM implementations may use different techniques to absorb the jitter(s) in the packet arrival time so that a speech packet may beefed to the decoder at evenly spaced periodic intervals. Consequently, there are various factors that may influence the packet loss that each UE can tolerate to maintain a quality voice session.

Figure 3:
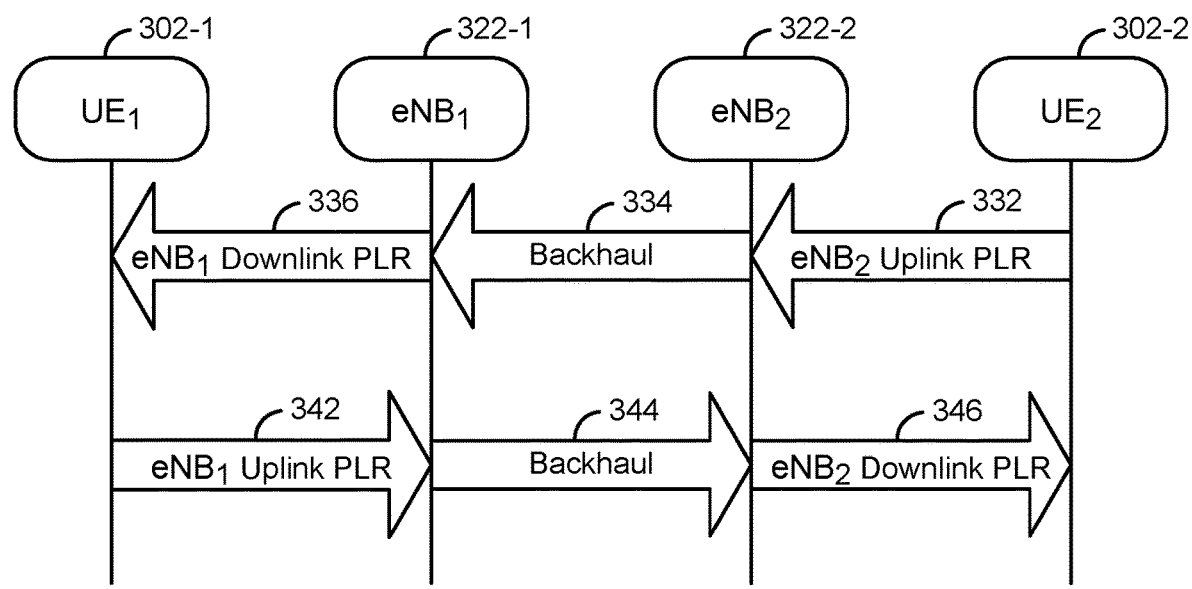
FIG. 3 illustrates an exemplary end-to-end communication flow between two terminals engaged in a voice-based multimedia session, according to various aspects.

One of the challenges in setting the appropriate handover threshold, which is generally handled at a mobile infrastructure in a WWAN or other wireless network, (e.g., at the eNB in an LTE network), is therefore to ensure that the end-to-end (e2e) error rate across the transport path from the media sender to receiver does not exceed the maximum packet loss that the codec, PLC, and JBM can handle without resulting in a substantially degraded quality and/or intelligibility. For example, referring to FIG. 3, voice transmissions in a direction from UE 302-2 to UE 302-1 are sent on an uplink 332 from UE 302-2 to a local eNB 322-2, which then forwards the transmissions to a local eNB 322-1 for the UE 302-1 over a backhaul link 334. The local eNB 322-1 then sends the voice transmissions to the receiving UE 302-1 on a downlink 336. Similarly, in the opposite direction, voice transmissions from UE 302-1 to UE 302-2 are sent on an uplink 342 from UE 302-1 to the local eNB 322-1, which then forwards the transmissions to the local eNB 322-2 for the UE 302-2 over a backhaul link 344. The local eNB 322-2 then sends the voice transmissions to the receiving UE 302-2 on a downlink 346. Assuming that there is no packet loss or negligible packet loss on the backhaul links 334, 344, this means that for the voice transmissions sent in the direction from UE 302-2 to UE 302-1, the sum of the packet loss rate (PLR) on the uplink 332 and the downlink 336 has to be less than or equal to the maximum PLR for the codec in use during the voice session and the PLC algorithm(s) and JBM implementation(s) in use at UE 302-1. Similarly, in the other direction of transmitting voice from UE 302-1 to UE 302-2, the sum of the packet loss rate (PLR) on the uplink 342 and the downlink 346 has to be less than or equal to the maximum PLR for the codec in use during the voice session and the PLC algorithm(s) and JBM implementation(s) in use at UE 302-2.

Figure 4A:
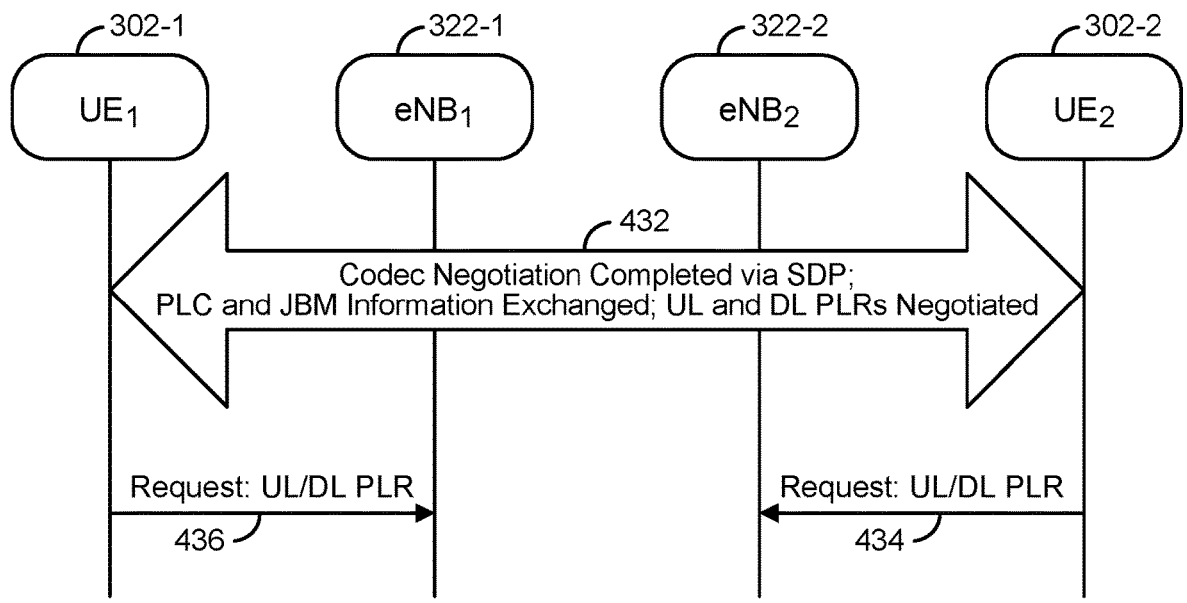
FIGS. 4A-4C illustrate exemplary communication flows that can be used to provide a base station with suitable information to establish an appropriate handover threshold based on tolerable packet loss at a terminal, according to various aspects.
Figure 4B:
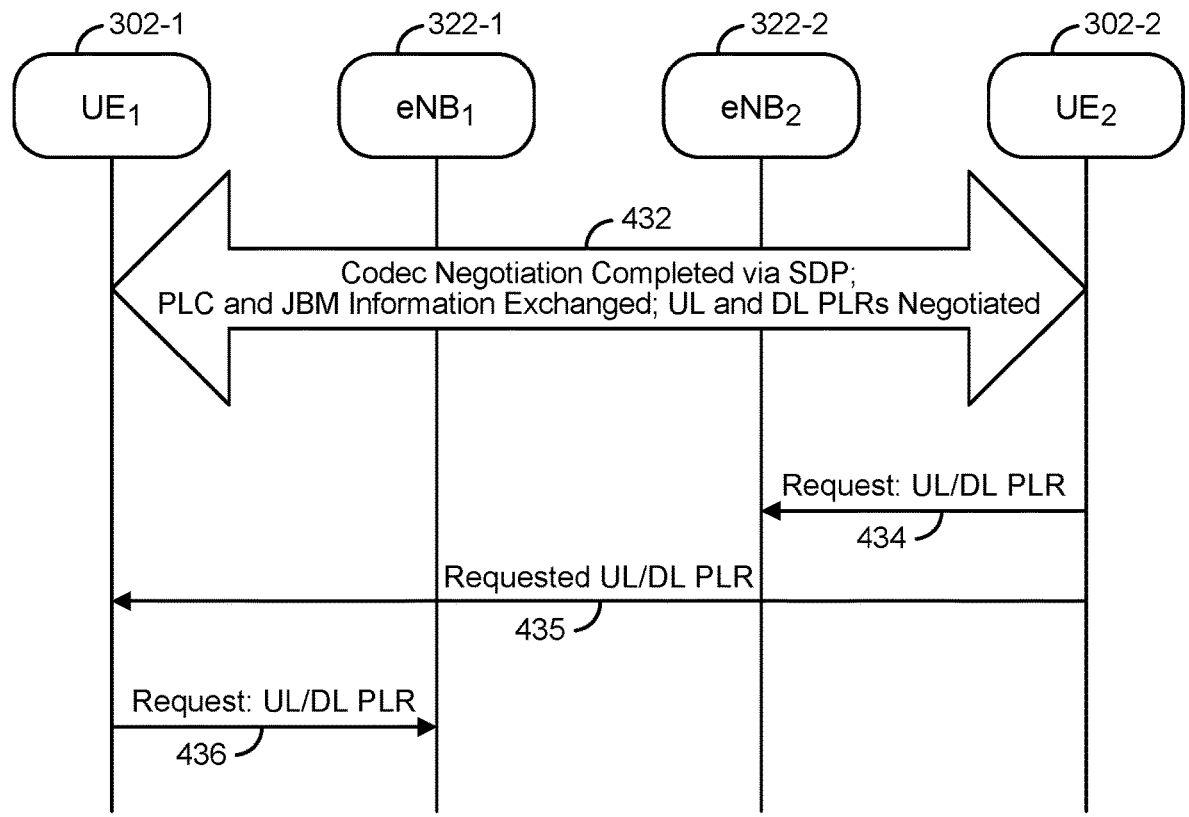
Figure 4C:
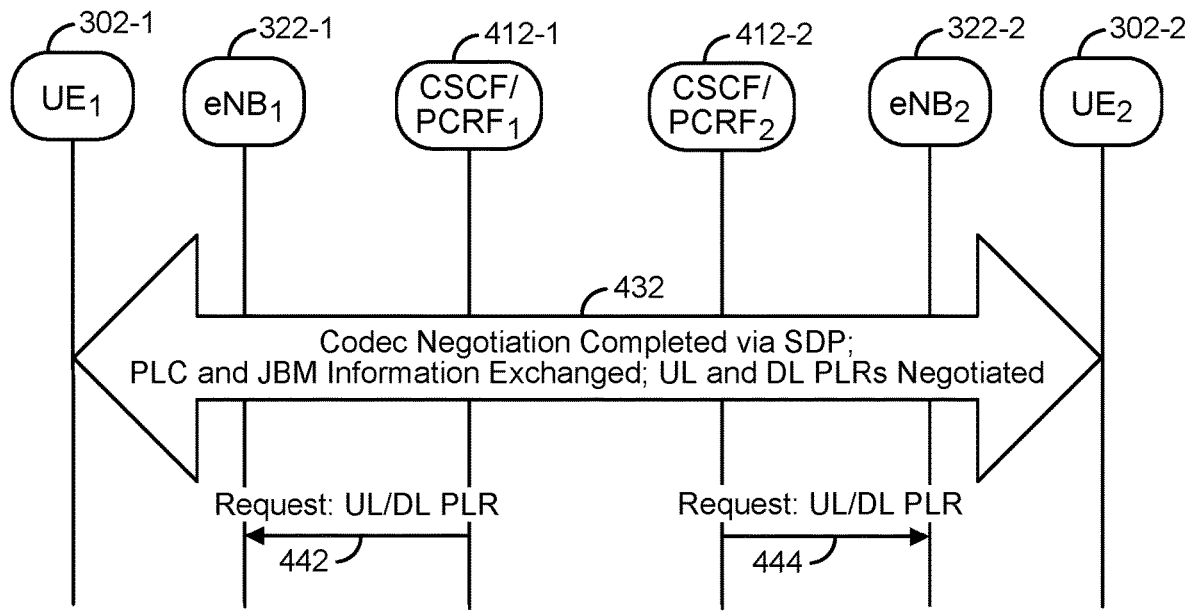

In some scenarios, the multimedia session negotiates the use of multiple codecs or codec modes with different robustness to packet losses. In such scenarios, the UEs 302-1, 302-2 can use any of the negotiated codecs or codec modes at any time and the infrastructure (e.g., eNBs 322-1, 322-2) does not explicitly know which codec is in use. Accordingly, FIGS. 4A-4C illustrate exemplary communication flows that can be used to provide a base station (e.g., eNBs 322-1, 322-2) with suitable information to establish an appropriate handover threshold based on tolerable packet loss at a terminal (e.g., UEs 302-1, 302-2). Furthermore, because the PLC algorithm(s) and JBM implementation(s) can vary from one terminal to another, the appropriate handover threshold may be UE-specific because two UEs that are using the same multimedia codec may be able to tolerate different PLRs due to differences in the PLC algorithm(s) and/or JBM implementation(s) in use at the respective UEs. However, because the PLC algorithm(s) and JBM implementation(s) and performance are conventionally only known at the terminal receiving media, the PLC algorithm(s) and JBM implementation(s) need to be signaled to the network. Furthermore, because there are typically two radio links in the end-to-end path from the sending terminal to the receiving terminal (e.g., uplink 332 and downlink 336 in the end-to-end path when sending from UE 302-2 to UE 302-1), the information has to be shared with the two eNBs 322-1, 322-2 in the transport path to determine how to set the appropriate PLR targets.

Accordingly, FIG. 4A illustrates one possible solution to signal PLR requirements to the two eNBs 322-1, 322-2 in the transport path between the UEs 302-1, 302-2 based on the codec in use as well as the PLC and JBM implementations in use. More particularly, at 432, the UEs 302-1, 302-2 may perform a codec negotiation, during which the UEs 302-1, 302-2 exchange information about their PLC and JBM capabilities. For example, the PLC capabilities may include one or more PLC algorithms such as zero insertion, waveform substitutions, model-based methods, while the JBM capabilities may refer to a target underflow rate or other suitable JBM implementation used to counter jitter in a packet-switched network (e.g., the effective packet loss, jitter induced packet/delay loss statistics experienced over time, location, etc.). The PLC and JBM capabilities could take the form of a total tolerable packet loss rate (PLR) that the respective UEs 302-1, 302-2 can tolerate for a given codec/mode and current PLC and JBM implementation. For example, codec mode can be any operating point of a codec, which may include different bit rates (e.g., as per EVS or AMR-WB codec rates in TS 26.441), audio bandwidths (e.g., narrowband, wideband, super-wideband), speech/audio coding types, channel aware or non-channel aware mode, extended PLC post-processing techniques, etc.

Based on this exchange of the required maximum end-to-end (e2e) PLR, the respective UEs 302-1, 302-2 can determine what maximum PLR to request of the respective local eNBs 322-1, 322-2. In various embodiments, the UEs 302-1, 302-2 can be specified, pre-configured, or dynamically configured (e.g., via Open Mobile Alliance Device Management (OMA-DM)) to divide the max end-to-end (e2e) PLR across the uplink and downlink according to an agreed-upon ratio. For example, the max e2e PLR could be divided according to a 1:1 ratio, whereby the UEs 302-1, 302-2 may request that the eNBs 322-1, 322-2 each provide links to support PLRs that are half of the max e2e PLR. Alternatively, the UEs 302-1, 302-2 can negotiate how to distribute the maximum tolerable end-to-end PLR according to a different ratio. For example, the UEs 302-1, 302-2 may negotiate a ratio that allows for more errors on an uplink than a downlink because LTE networks typically have more limited uplink coverage. As such, referring again to FIG. 3, if the variable R is used to represent the ratio of the uplink PLR to the downlink PLR, then UE 302-1 may request that eNB 322-1 support on the uplink 342 from UE 302-1 to eNB 322-1 a PLR equal to the maximum e2e PLR that UE 302-2 can tolerate multiplied by $R/(R+1)$, and UE 302-1 may further request that eNB 322-1 support on the downlink 336 a PLR equal to the maximum e2e PLR that UE 302-1 can tolerate multiplied by $1/(R+1)$. In a similar respect, UE 302-2 may request that eNB 322-2 support on the uplink 332 from UE 302-2 to eNB 322-2 a PLR equal to the maximum e2e PLR that UE 302-1 can tolerate multiplied by $R/(R+1)$ and further request that eNB 322-2 support on the downlink 346 a PLR equal to the maximum e2e PLR that UE 302-2 can tolerate multiplied by $1/(R+1)$.

According to various aspects, in a further alternative, as will be described in further detail below, the UEs 302-1, 302-2 may engage in a negotiation (e.g., via Session Description Protocol (SDP)) to explicitly negotiate how to distribute the distribute the maximum tolerable end-to-end PLR. For example, assuming that UE 302-1 employs PLC and/or JBM implementations that permit more tolerable packet loss relative to PLC and/or JBM implementations used at UE 302-2, UE 302-1 could request that eNB 322-1 provide a link to support a greater PLR relative to a link that UE 302-2 requests from eNB 322-2. For example, at 432, UE 302-1 may send a Session Description Protocol (SDP) message with the maximum end-to-end PLR that the UE 302-1 can receive for a codec mode and a current PLC/JMB implementation (e.g., six percent). The other UE 302-2 receives the parameter in the SDP message and decides to use of a portion of this end-to-end PLR for the uplink to eNB 322-2 (e.g., four percent). The UE 302-2 then responds to UE 302-1 to indicate that UE 302-2 will use 4% or tell UE 302-1 that UE 302-1 has to request the remaining 2% tolerable PLR from local eNB 322-1. UE 302-2 also signals the local eNB 322-2 to indicate that UE 302-2 only requires 4% PLR on the uplink to eNB 322-2. In any case, as depicted at 434, the UE 302-2 signals its respective uplink and downlink PLR requirements to the local eNB 322-2, while the UE 302-1 similarly signals uplink and downlink PLR requirements to its local eNB 322-1 at 436.

According to various aspects, FIG. 4B illustrates another possible solution to signal PLR requirements to the two local eNBs 322-1, 322-2 in the transport path between the UEs 302-1, 302-2 based on the codec in use as well as the PLC and JBM implementations in use at the respective UEs 302-1, 302-2. In the communication flow shown in FIG. 4B, at 432, the UEs 302-1, 302-2 may engage in a codec negotiation in a similar manner as described above with respect to FIG. 4A. However, the communication flow in FIG. 4B differs in the sense that one terminal (i.e., UE 302-2 in the illustrated example) makes the initial decision as to what PLR to request from the local eNB 322-2 and signals the initial decision accordingly at 434. Then, at 435, the UE 302-2 sends a message to UE 302-1 to indicate the PLR that UE 302-2 expects to be requested from eNB 322-1, and UE 302-1 then requests the indicated PLR from eNB 322-1, as depicted at 436.

According to various aspects, FIG. 4C illustrates still another possible solution to signal PLR requirements to the two eNBs 322-1, 322-2 in the transport path between the UEs 302-1, 302-2 based on the codec in use as well as the PLC and JBM implementations in use at the respective UEs 302-1, 302-2. More particularly, at 432, the UEs 302-1, 302-2 may perform a codec negotiation, during which the UEs 302-1, 302-2 exchange information about their PLC and JBM capabilities. For example, the PLC capabilities may include one or more PLC algorithms such as zero insertion, waveform substitutions, model-based methods, while the JBM capabilities may refer to a target underflow rate or other suitable JBM implementation used to counter jitter in a packet-switched network (e.g., the effective packet loss, jitter induced packet/delay loss statistics experienced over time, location, etc.). The PLC and JBM capabilities could take the form of a total tolerable packet loss rate (PLR) that the respective UEs 302-1, 302-2 can tolerate for a given codec/mode and current PLC and JBM implementation.

Based on this exchange of the required maximum end-to-end PLR, one or more network elements can determine what maximum PLR to request of the respective local eNBs 322-1, 322-2. For example, as shown in FIG. 4C, the network element(s) may comprise a Call Session Control Function (CSCF) or Policy and Charging Rules Function (PCRF) 412-1 that sends a message 442 to eNB 322-1 to signal the uplink and downlink PLR for UE 302-1 as well as a CSCF/PCRF 412-2 that sends a message 444 to eNB 322-2 to signal the uplink and downlink PLR for UE 302-2. In various embodiments, the CSCF/PCRFs 412-1, 412-2 can decide to request that each of the eNBs 322-1, 322-2 provide links to support PLRs that are based on a particular ratio. For example, the ratio may be a 1:1 ratio such that half of the max end-to-end PLR is allocated to the uplink and the other half to the downlink, or the CSCF/PCRFs 412-1, 412-2 can decide on a ratio whereby the maximum tolerable end-to-end PLR allows more errors on an uplink because LTE networks tend to have more limited uplink coverage. In such cases where a ratio is used, the variable R may represent the ratio of the uplink PLR to the downlink PLR. As such, the CSCF/PCRF 412-1 may request that eNB 322-1 support on the uplink from UE 302-1 a PLR equal to the maximum e2e PLR that UE 302-2 can tolerate multiplied by $R/(R+1)$ and further request that eNB 322-1 support on the downlink to UE 302-1 a PLR equal to the maximum e2e PLR that UE 302-1 can tolerate multiplied by $1/(R+1)$. In a similar respect, CSCF/PCRF 412-2 may request that eNB 322-2 support on the uplink from UE 302-2 a PLR equal to the maximum e2e PLR that UE 302-1 can tolerate multiplied by $R/(R+1)$ and further request that eNB 322-2 support on the downlink to UE 302-2 a PLR equal to the maximum e2e PLR that UE 302-2 can tolerate multiplied by $1/(R+1)$.

In various embodiments, another approach may be based upon a Session Description Protocol (SDP) negotiation between the UEs 302-1, 302-2. For example, UE 302-1 may send a Session Description Protocol (SDP) message with the maximum end-to-end PLR that the UE 302-1 can receive for a codec mode and a current PLC/JMB implementation (e.g., six percent). The CSCF/PCRF 412-1 may see the parameter in the SDP message and decides to allocate on the downlink to UE 302-1 a proportion of the maximum end-to-end PLR (e.g., 2% out of the advertised 6%). At 442, the CSCF/PCRF 412-1 therefore tells the local eNB 322-1 to support 2% PLR on the downlink to UE 302-1. The CSCF/PCRF 412-1 also modifies the parameter in the SDP offer to indicate that 4% PLR is required and sends this modified SDP offer to the CSCF/PCRF 412-2. The CSCF/PCRF 412-2 then uses the modified PLR value in the SDP offer to set the uplink PLR at eNB 322-2 (e.g., directing the eNB 322-2 to use 4% PLR on an uplink from UE 302-2). Furthermore, a similar procedure may happen in the reverse direction. In particular, UE 302-2 sends back in an SDP answer the maximum PLR that UE 302-2 can receive and the local CSCF/PCRF 412-2 takes a portion of the PLR budget. The local CSCF/PCRF 412-2 also directs the local eNB 322-2 to set this for the downlink to UE 302-2, modifies the maximum PLR value in the SDP answer before relaying the SDP answer onto CSCF/PCRF 412-1, which in turn directs the local eNB 322-1 to use the modified maximum PLR value for the uplink from UE 302-1.

According to various aspects, as described above, FIGS. 4A-4C each illustrate a signaling exchange 432 during which UEs 302-1, 302-2 negotiate a codec and/or codec mode and further exchange PLC and JBM information. Accordingly, and with further reference to FIG. 3, the UEs 302-1, 302-2 may use the signaling exchange 432 to negotiate a maximum end-to-end error rate and an error rate for each link, including at least an uplink 342 from UE 302-1 to eNB 322-1 and a downlink 346 from eNB 322-2 to UE 302-2 in a direction from UE 302-1 to UE 302-2 as well as an uplink 332 from UE 302-2 to eNB 322-2 and a downlink 336 from eNB 322-1 to UE 302-1 in a direction from UE 302-2 to UE 302-1. In various embodiments, the maximum end-to-end error rate and the error rate for each link may comprise packet loss rate (PLR) values and/or block error rate (BLER) values, which are generally expressed as percentages. As such, although various aspects described herein may refer to PLR values or BLER values, those skilled in the art will appreciate that the various aspects and embodiments described herein may be suitably practiced using PLR values and/or BLER values. In any case, with reference to FIG. 3 and the signaling exchange 432 in FIGS. 4A-4C, the following description sets forth exemplary mechanisms that the two endpoint UEs 302-1, 302-2 may use to negotiate a maximum end-to-end error rate and an error rate for each of the links 332, 336, 342, 346. In the following description, the maximum end-to-end error rate and the link-specific error rates are described as PLR percentage values for simplicity. However, as noted above, the negotiation mechanisms could instead be implemented using error rates based on BLER percentage values.

According to various aspects, as described herein, the maximum end-to-end PLR and the PLR for each of the links 332, 336, 342, 346 may be pre-configured at the device level (e.g., at manufacture time) and/or configured at the device level via Open Mobile Alliance Device Management (OMA-DM). For example, as noted above, the PLR values may generally depend on device-specific and/or operator-specific parameters related to supported codecs, supported codec modes, PLC algorithms, JBM implementations, and so on. Furthermore, in various embodiments, the maximum end-to-end and link-specific PLR values can be dependent on network conditions. For example, the network may be lightly or heavily loaded at any given point in time, which may impact the ability of the network to support a given PLR value. In other examples, the network may include one or more areas in which good coverage can be provided (e.g., a low uplink/downlink PLR) until an edge of cell is reached, or the maximum PLR values may depend on operator policy (e.g., the network may provide less reliable bearers during busy times of day), etc. In various embodiments, this non-static information about the supported PLR can be communicated to the CSCF/PCRFs 412-1, 412-2, which may then modify one or more parameters used in a Session Description Protocol (SDP) offer/answer exchange between the UEs 302-1, 302-2 to reflect the link-specific PLR limitation(s). In one alternative implementation, the network PLR conditions could be sent to the UEs 302-1, 302-2 prior to the UEs 302-1, 302-2 initiating the SDP offer/answer negotiation (i.e., the network PLR conditions are broadcast across the cell). In various embodiments, such as that shown FIG. 4C, one or more network nodes such as the CSCF/PCRFs 412-1, 412-2 may look at the result of the SDP offer/answer negotiation between the endpoint UEs 302-1, 302-2 and make appropriate requests to the respective eNBs 322-1, 322-2 via messages 442, 444.

According to various aspects, during the SDP offer/answer negotiation, one of the endpoint UEs 302-1, 302-2 may be an offeror device and the other may be an answerer device. As will be described in further detail herein, certain SDP attributes may be used in the SDP offer/answer negotiation, including a triad for the offeror device that specifies (i) a maximum end-to-end (e2e) PLR that the offeror device is setup to receive (max_e2e_PLR_Off), (ii) a proposed uplink PLR in a direction from the offeror device to the answerer device (UL_PLR_Off), and (iii) a proposed downlink PLR in a direction from the answerer device to the offeror device (DL_PLR_Off). In addition, the SDP attributes used in the SDP offer/answer negotiation may include a substantially similar triad for the answerer device, wherein the answerer triad specifies (i) a maximum end-to-end (e2e) PLR that the answerer device is setup to receive (max_e2e_PLR_Ans), (ii) a proposed uplink PLR in a direction from the answerer device to the offeror device (UL_PLR_Ans), and (iii) a proposed downlink PLR in a direction from the offeror device to the answerer device (DL_PLR_Ans). As noted above, all PLR values may be expressed as percentages. Furthermore, because the uplink PLR plus the downlink PLR in a given direction generally adds up to the total end-to-end PLR, the offeror triad and the answerer triad mentioned above are subject to the following constraints:

$$UL\_PLR\_Off+DL\_PLR\_Ans<=max\_e2e\_PLR\_Ans,$$
and $$UL\_PLR\_Ans+DL\_PLR\_Off<=max\_e2e\_PLR\_Off.$$

According to various aspects, based on the above-mentioned SDP attributes, the SDP offer/answer negotiation may proceed as follows. First, the offeror device may send an SDP offer to the answerer device that indicates the offeror triad set, including max_e2e_PLR_Off, UL_PLR_Off, and DL_PLR_Off. The answerer device, upon receiving the SDP offer, may then either accept or modify the proposed UL_PLR_Off and DL_PLR_Off values. For example, if the proposed UL_PLR_Off exceeds the difference between max_e2e_PLR_Ans and DL_PLR_Ans, the proposed UL_PLR_Off may be more than the answerer device can handle. In such cases, the answerer device may reduce the proposed UL_PLR_Off value to fit within the end-to-end PLR limit that the answerer device can handle, taking into consideration any portion thereof that the answerer device may need to reserve for DL_PLR_Ans. When the answerer device receives the SDP offer, the answerer device may have all the information needed to either accept or modify the offer based on the information in the offeror triad and the PLR configuration at the answerer device, specifically the values for max_e2e_PLR_Ans, UL_PLR_Ans, and DL_PLR_Ans. In the event that the answerer device decides to modify the PLR parameters specified in the offeror triad, the offeror device may either accept the modified PLR parameters in the modified offer or reject the modified offer. In various embodiments, the answerer device may therefore respond with its triad set. In certain cases, because the uplink PLR and the downlink PLR in a given direction add up to the total end-to-end PLR in that direction, the answerer device may only need to provide the max_e2e_PLR_Ans value, as the other values can be derived from the values in the offeror triad. However, as discussed below, reducing the parameters provided in the SDP answer may not allow for scenarios that do not exhaust the entire PLR budget (e.g., to maintain a higher quality voice call) and/or limit applicability to scenarios in which the uplink PLR and downlink PLR are split equally.

In one implementation, the SDP offer/answer negotiation as described above may be applied in a scenario in which the answerer device has a PLR configuration that indicates agreement with the offeror triad included in the SDP offer from the offeror device and further in which the entire end-to-end PLR budget is utilized. For example, the SDP offer may include an offeror triad in which max_e2e_PLR_Off equals five (5), UL_PLR_Off equals seven (7), and DL_PLR_Off equals one (1). Assuming the answerer device can support these PLR requirements based on supported codecs/codec modes, PLC algorithms, and/or JBM implementations, the answerer device may insert the answerer triad into the SDP answer without modifying the offeror triad. As such, because the entire end-to-end PLR budget is utilized in this example, the SDP answer may include an answerer triad in which max_e2e_PLR_Ans equals nine (9), UL_PLR_Ans equals four (4), and DL_PLR_Ans equals two (2). Accordingly, in a direction from the answerer device to the offeror device, the maximum 5% end-to-end budget for max_e2e_PLR_Off is split up into 1% PLR for the downlink to the offeror device and 4% PLR for the uplink from the answerer device. Similarly, in a direction from the offeror device to the answerer device, the maximum 9% end-to-end budget for max_e2e_PLR_Ans is split up into 2% PLR for the downlink to the answerer device and 7% PLR for the uplink from the offeror device.

In another example implementation, the SDP offer/answer negotiation as described above may be applied in a scenario in which the answerer device has a PLR configuration that agrees with the offeror triad included in the SDP offer from the offeror device, except that this scenario may differ from the previous scenario in that the entire end-to-end PLR budget is not utilized. As will be apparent to those skilled in the art, voice quality may generally degrade as PLR/BLER increases, whereby utilizing less than the entire end-to-end PLR budget may leader to a better quality voice session. For example, the SDP offer may include an offeror triad in which the value for max_e2e_PLR_Off is ten (10), the value for UL_PLR_Off is five (5), and the value for DL_PLR_Off is one (1). Assuming the answerer device can support these PLR requirements based on supported codecs/codec modes, PLC algorithms, and/or JBM implementations, the answerer device may insert the answerer triad into the SDP answer without modifying the offeror triad. However, because the entire end-to-end PLR budget is not utilized in this example, the SDP answer may include an answerer triad in which the values are configured to not utilize the entire max_e2e_PLR_Off and/or max_e2e_PLR_Ans end-to-end budgets. For example, in one possible answerer triad that may achieve this objective, the value for max_e2e_PLR_Ans may be set to nine (9), the value for UL_PLR_Ans may be set to four (4), and the value for DL_PLR_Ans may be set to two (2). Accordingly, in a direction from the answerer device to the offeror device, the maximum 10% end-to-end budget for max_e2e_PLR_Off is split up into 1% PLR for the downlink to the offeror and 4% PLR for the uplink from the answerer, leaving 5% of the end-to-end budget unutilized. Similarly, in a direction from the offeror device to the answerer device, the maximum 9% end-to-end budget for max_e2e_PLR_Ans is split up into 2% PLR for the downlink to the answerer and 5% PLR for the uplink from the offeror, leaving 2% of the end-to-end budget unutilized.

In still another example implementation, the SDP offer/answer negotiation as described above may be applied in a scenario in which the answerer device has a PLR configuration that conflicts with the offeror triad included in the SDP offer from the offeror device, wherein the entire end-to-end PLR budget may need to be utilized in order to fit the link-specific PLR values within the maximum end-to-end PLR values in either or both directions. For example, this scenario may be illustrated in an SDP offer that includes an offeror triad in which the value for max_e2e_PLR_Off is ten (10), the value for UL_PLR_Off is seven (7), and the value for DL_PLR_Off is one (1). Assuming that the answerer device has a PLR configuration in which max_e2e_PLR_Ans is seven (7), UL_PLR_Ans is four (4), and DL_PLR_Ans is two (2), the proposed value for UL_PLR_Off exceeds the limit defined by the difference between max_e2e_PLR_Ans and DL_PLR_Ans. As such, the answerer device may modify the SDP offer to reduce the value for UL_PLR_Off from seven (7) to five (5) such that UL_PLR_Off+DL_PLR_Ans=max_e2e_PLR_Ans. In such a case, the SDP answer may include SDP attributes in which max_e2e_PLR_Ans is seven (7), UL_PLR_Ans is four (4), DL_PLR_Ans is two (2), and further in which the offeror triad is modified such that max_e2e_PLR_Off remains at ten (10), UL_PLR_Off is reduced to five (5), and DL_PLR_Off remains at one (1). Upon receiving the SDP answer, the offeror device can either accept or reject the payload type.

According to various aspects, as mentioned briefly above, there may be certain cases in which the number of SDP attributes used in the SDP offer/answer can be reduced from the three used in the offeror/answerer triads described above. For example, in various embodiments, the uplink PLR and the downlink PLR in a given direction can generally be assumed to add up to the total end-to-end PLR in that direction. As such, the offeror/answerer PLR configurations could be simplified to two parameters, namely the end-to-end PLR and the link-specific PLR in either the uplink or the downlink direction, as the PLR in the other direction can be derived from the other values. However, this approach does not allow for scenarios in which the entire end-to-end PLR budget is not utilized (e.g., to maintain better voice quality). Furthermore, another possible simplification may be to only communicate one parameter, namely the maximum end-to-end PLR budget, which may be well-suited to implementations in which the maximum end-to-end PLR budget is equally split among the uplink PLR and the downlink PLR.

According to various aspects, with specific reference to FIG. 4C, the above-described principles may be applied in a scenario where the CSCF/PCRFs 412-1, 412-2 send the required maximum uplink PLR and downlink PLR values to the eNBs 322-1, 322-2 using messages 442, 444. For example, in an SDP-negotiated approach, the UEs 302-1, 302-2 may negotiate the proportion of the maximum end-to-end (e2e) PLR to allocate to the uplink and downlink associated with their local eNBs 322-1, 322-2 in a substantially similar manner as described above. However, rather than having the UEs 302-1, 302-2 request the resulting uplink and downlink PLRs directly from the eNBs 322-1, 322-2, the CSCF/PCRFs 412-1, 412-2 may examine the SDP answer to extract the negotiated PLR configuration and communicate the appropriate values to the respective local eNBs 322-1, 322-2. For example, if UE 302-1 is the offeror device and UE 302-2 is the answerer device, then CSCF/PCRF 412-1 may ask eNB 322-1 to support UL_PLR_Off on its uplink from UE 302-1 and further ask eNB 322-1 to support on DL_PLR_Off on its downlink to UE 302-1 based on the appropriate values indicated in the SDP answer from UE 302-2. Furthermore, CSCF/PCRF 412-2 may ask eNB 322-2 to support UL_PLR_Ans on its uplink from UE 302-2 and further ask eNB 322-2 to support DL_PLR_Ans on its downlink to UE 302-2.

According to various aspects, a PCRF-negotiated approach may also be implemented, which may advantageously leverage the fact that the CSCF/PCRFs 412-1, 412-2 may have more dynamic information about the loading and coverage situation of the eNBs 322-1, 322-2 serving the UEs 302-1, 302-2. As such, in the PCRF-negotiated approach, the CSCF/PCRFs 412-1, 412-2 negotiate the proportion of the maximum end-to-end (e2e) PLR to allocate to the uplinks and downlinks associated with eNBs 322-1, 322-2 as follows. First, in an SDP offer to the answerer UE 302-2, the offeror UE 302-1 may indicate its maximum end-to-end PLR (max_e2e_PLR_Off). The CSCF/PCRF 412-1 may see this parameter value decide how to allocate a proportion of max_e2e_PLR_Off to the downlink of eNB 322-1 based on operator policy, which may be indicated by adding DL_PLR_Off in the SDP offer. The CSCF/PCRF 412-1 may also indicate a preferred uplink PLR by adding UL_PLR_Off into the SDP offer. The CSCF/PCRF 412-2 may store the values of DL_PLR_Off and UL_PLR_Off in the SDP offer and remove these SDP parameters from the SDP offer before forwarding this onto the answerer UE 302-2. The answerer UE 302-2 receives the SDP offer, and responds by including its maximum end-to-end PLR, max_e2e_PLR_Ans in the SDP answer it sends back. The CSCF/PCRF 412-2 receives the SDP answer and checks that DL_PLR_Ans plus UL_PLR_Off is less than max_e2e_PLR_Ans. If this condition is met, then CSCF/PCRF 412-2 adds DL_PLR_Ans and UL_PLR_Off into the SDP Answer. Otherwise, the CSCF/PCRF 412-2 modifies both DL_PLR_Ans and UL_PLR_Off so that their sum is less than max_e2e_PLR_Ans and then includes them into the SDP answer. In a similar respect, the CSCF/PCRF 412-2 may check that UL_PLR_Ans plus DL_PLR_Off is less than max_e2e_PLR_Off. If this condition is met, then the CSCF/PCRF 412-1 may add UL_PLR_Ans and DL_PLR_Off into the SDP Answer. Otherwise, the CSCF/PCRF 412-2 modifies both UL_PLR_Ans and DL_PLR_Off so that their sum is less than max_e2e_PLR_Off and then includes them into the SDP answer. When the CSCF/PCRF 412-1 receives the SDP answer, the SDP answer may be rejected if the values of UL_PLR_Off and DL_PLR_Off that were modified by the CSCF/PCRF 412-2 are not acceptable. If the CSCF/PCRF 412-1 accepts the SDP answer, then both CSCF/PCRFs 4121, 412-2 have all the information needed to communicate the required UL and DL PLRs to their local eNBs 322-1, 322-2.

According to various aspects, in some embodiments, the PCRF-negotiated approach may be implemented using a single SDP parameter, namely, the maximum end-to-end PLR, or max_e2e_PLR. In the description below the "_Off" and "_Ans" extensions are added for clarity to aid in understanding what is being described, as only the max_e2e_PLR parameter may be used in the actual SDP parameter. In the PCRF-negotiated approach using the single SDP parameter, the offeror UE 302-1 sends max_e2e_PLR_Off in the SDP offer. The CSCF/PCRF 412-1 may see this parameter in the SDP offer and decide that it will allocate on the downlink to UE 302-1 DL_PLR_Off which is less than max_e2e_PLR_Off. The CSCF/PCRF 412-1 also modifies the max_e2e_PLR_Off parameter in the SDP offer to indicate a new max_e2e_PLR_Off=old max_e2e_PLR_Off–DL_PLR_Off. This modified SDP offer is sent to the CSCF/PCRF 412-2, which uses the modified max_e2e_PLR_Off value in the SDP offer to set the uplink PLR at eNB 322-2 to UL_PLR_Ans=new max_e2e_PLR_Off. The CSCF/PCRF 412-2 could also choose to use a UL_PLR_Ans that is less than new max_e2e_PLR_Off if it did not want to use the entire e2e PLR budget. In the reverse direction a similar procedure happens, wherein the answerer UE 302-2 sends its max_e2e_PLR_Ans in the SDP answer. The local CSCF/PCRF 412-2 takes a portion of max_e2e_PLR_Ans and allocates it to the downlink of eNB 322-2 in DL_PLR_Ans.

The CSCF/PCRF 412-2 also modifies the max_e2e_PLR_Ans in the SDP answer to indicate a new max_e2e_PLR_Ans=old max_e2e_PLR_Ans−DL_PLR_Ans. The CSCF/PCRF 412-2 then sends this modified max_e2e_PLR_Ans value to the CSCF/PCRF 412-1, which uses the modified max_e2e_PLR_Ans value in the SDP answer to set the uplink PLR at eNB 322-1 such that UL_PLR_Off=new max_e2e_PLR_Ans. The CSCF/PCRF 412-1 could also choose to use a value for UL_PLR_Off that is less than new max_e2e_PLR_Ans if it did not want to use the entire e2e PLR budget.

According to various aspects, exemplary communication flows that can be used to ensure that terminals engaged in a voice session will use more robust multimedia codecs or codec modes upon reaching a coverage edge will now be described with reference to FIG. 5. In particular, according to various embodiments, each UE engaged in a voice session may determine actual packet loss rates during the voice session. When the far-end UE receiving media packets detects an increase in packet loss due to poor network coverage, the far-end UE receiving the media packets may send a request (e.g., using codec mode request (CMR)) to the UE transmitting the media packets to use a more robust codec or codec mode (e.g., move from AMR or AMR-WB to EVS, from EVS to EVS Channel-Aware, etc.). In other examples, when the UE receiving the media packets detects the increased packet loss due to poor network coverage, the receiving UE may send a request to the transmitting UE to use application layer redundancy and/or payload or partial redundancy depending on the negotiated bitrate. In another possible solution, the transmitting UE may detect poor network coverage (e.g., due to low transmission power headroom, build-up in an uplink transmission buffer, etc.). In such cases, the transmitting UE may autonomously start to transmit using a more robust codec or a more robust mode of a codec.

Figure 5:
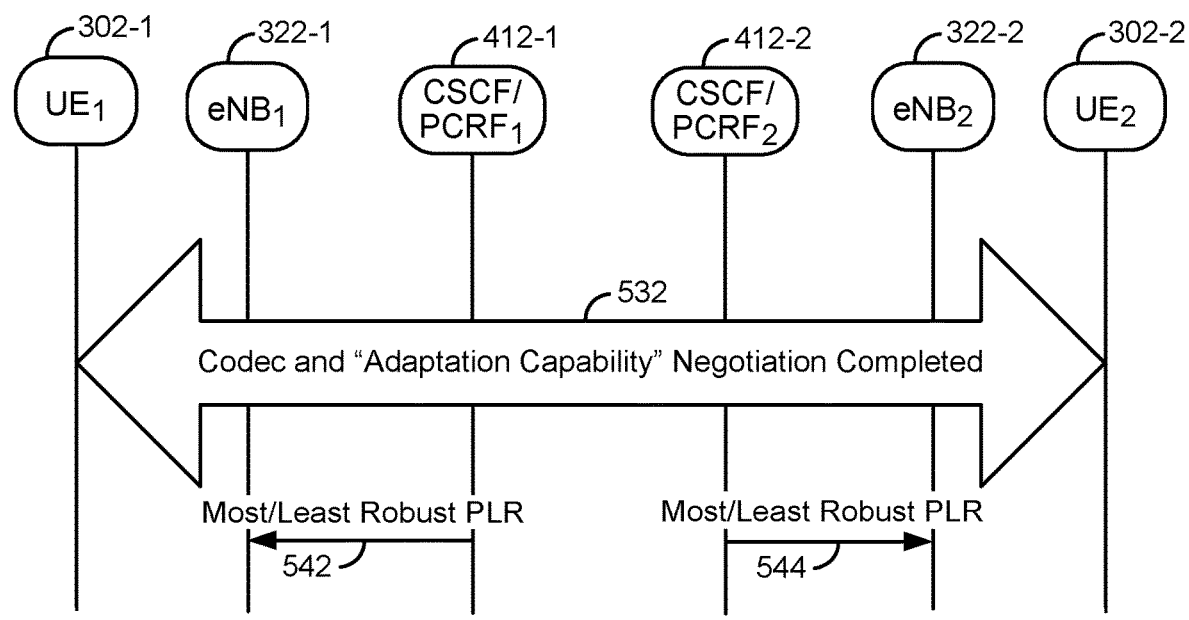
FIG. 5 illustrates an exemplary communication flow that can be used to ensure that terminals engaged in a voice session will use more robust multimedia codecs or codec modes upon reaching a coverage edge, according to various aspects.

According to various aspects, another possible solution to ensure that terminals engaged in a voice session will use more robust multimedia codecs or codec modes is illustrated in FIG. 5. The communication flow shown in FIG. 5 may be based on a Session Description Protocol (SDP) parameter that indicates that both UEs 302-1, 302-2 will perform codec adaptation, which may be exchanged between the UEs 302-1, 302-2 as part of the initial codec negotiation performed at 532. When the core network elements (e.g., the CSCF/PCRFs 412-1, 412-2) detect that the SDP codec adaptation parameter/capability has been negotiated, the CSCF/PCRFs 412-1, 412-2 may send the PLR associated with the most robust mode to the local eNBs 322-1, 322-2 at 542, 544. This may be based on an assumption that the UEs 302-1, 302-2 will switch to a more robust codec/mode in the event that network coverage becomes poor. Otherwise, where the SDP codec adaptation parameter/capability has not been negotiated, the CSCF/PCRFs 412-1, 412-2 may send the local eNBs 322-1, 322-2 the PLR associated with the least robust mode (e.g., to assure call continuity when there is uncertainty as to whether the UEs 302-1, 302-2 will switch to a more robust codec/mode). Furthermore, this codec adaptation parameter could also be useful in general, as the CSCF/PCRFs 412-1, 412-2 could use the codec adaptation parameter to determine whether and/or when to set a Maximum Bit Rate (MBR) to be greater than a Guaranteed Bit Rate (GBR).

According to various aspects, one possible issue that may arise when using application layer redundancy (instead of the partial redundancy used in EVS Channel-Aware mode) to improve error robustness of the codec when at the coverage edge is that the particular configuration that the UEs 302-1, 302-2 will use when high packet loss is detected may be unknown because there are several possibilities that tradeoff between speech quality and error robustness (e.g., different PLC and/or JBM implementations, different codec/mode configuration options, etc.). As such, to handle this uncertainty, the UEs 302-1, 302-2 may be configured to indicate (e.g., in SDP) a "most robust codec configuration" supported at the respective UEs 302-1, 302-2 so that the network elements (e.g., eNBs 322-1, 322-2 and CSCF/PCRFs 412-1, 412-2) may know what to expect when one or more of the UEs 302-1, 302-2 approach the coverage edge or otherwise detect increased packet loss and/or poor network coverage. The appropriate network element(s) can thereby set the applicable SRVCC threshold(s) according to the most robust codec configuration indicated by the respective UEs 302-1, 302-2. Furthermore, in various embodiments, an operator may optionally configure one or more of the UEs 302-1, 302-2 to use a particular configuration when high packet loss is detected and this configuration may be signaled via SDP to the far end eNB and UE. In an example embodiment, based on the signaling from the UEs 302-1, 302-2, the eNBs 322-1, 322-2 may be configured to further update or modify an SRVCC threshold(s) that was originally set based on the signaling from CSCF/PCRFs 412-1, 412-2, respectively. In another example embodiment, based on the signaling from the CSCF/PCRFs 412-1, 412-2, the eNBs 322-1, 322-2 may be configured to further update or modify an SRVCC threshold(s) and/or other suitable handoff threshold that was originally set based on the signaling from UEs 302-1, 302-2, respectively. In another example embodiment, the eNBs 322-1, 322-2 may be configured to further update or modify an SRVCC threshold(s) and/or other suitable handoff threshold based on the signaling from both the UEs 302-1, 302-2 and CSCF/PCRFs 412-1, 412-2.

Figure 6:
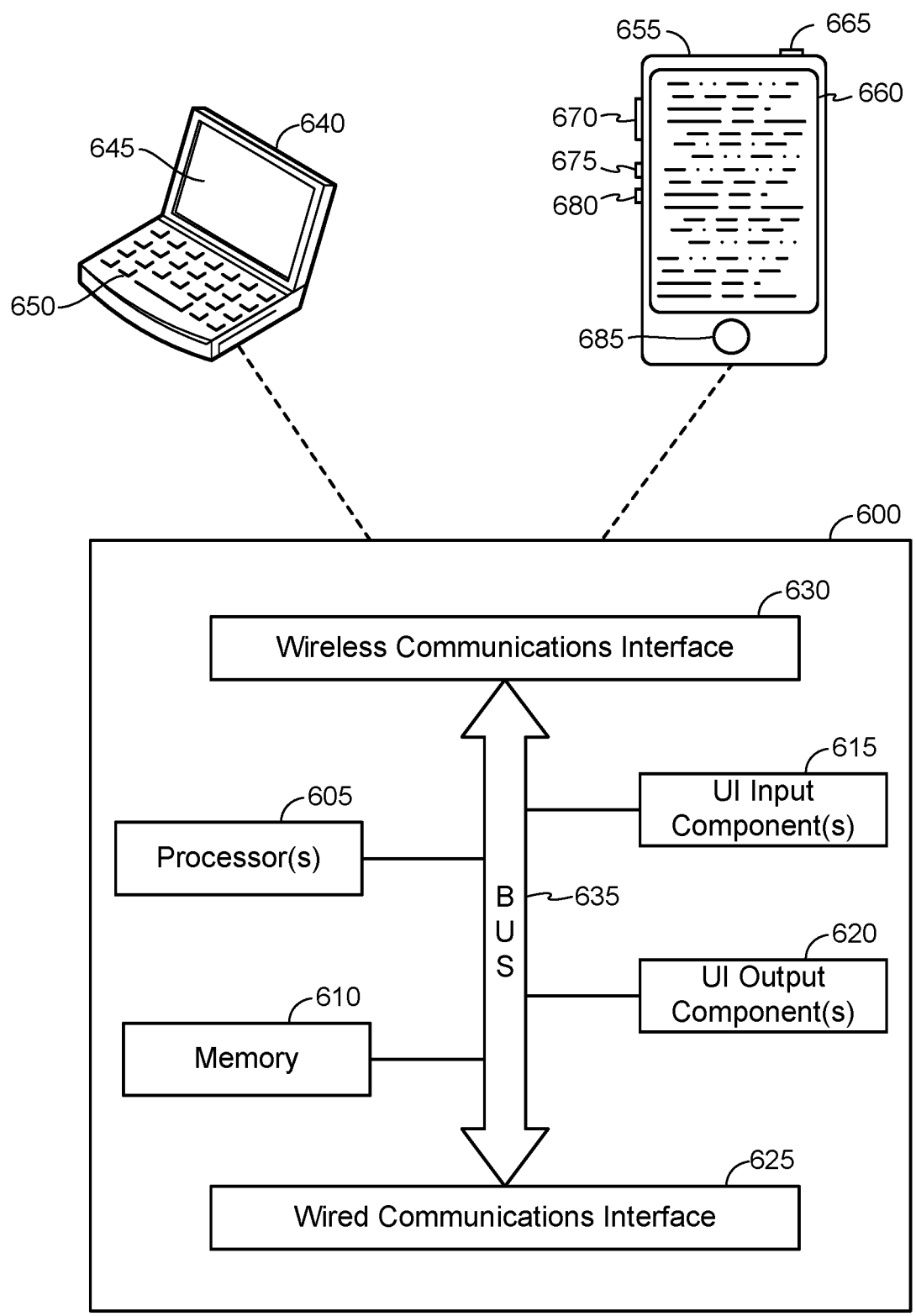
FIG. 6 illustrates exemplary user equipment (UE) configurations that may be used in accordance with the various aspects and embodiments described herein.

Referring now to FIG. 6, a user equipment (UE) 600 is illustrated that may have a configuration suitable for use in accordance with the various aspects and embodiments described herein. In general, the UE 600 may include one or more processors 605 (e.g., one or more ASICs, one or more digital signal processors (DSPs), etc.) and a memory 610 (e.g., RAM, ROM, EEPROM, flash cards, or any memory common to computer platforms). The UE 600 also includes one or more UI input components 615 (e.g., a keyboard and mouse, a touchscreen, a microphone, one or more buttons such as volume or power buttons, etc.) and one or more UI output components 620 (e.g., speakers, a display screen, a vibration device for vibrating the UE 600, etc.).

The UE 600 further includes a wired communications interface 625 and a wireless communications interface 630. In an example embodiment, the wired communications interface 625 can be used to support wired local connections to peripheral devices (e.g., a USB connection, a mini USB or lightning connection, a headphone jack, graphics ports such as serial, VGA, HDMI, DVI or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless communications interface 630 includes one or more wireless transceivers for communication in accordance with a local wireless communications protocol (e.g., WLAN, Wi-Fi Direct, Bluetooth, etc.). The wireless communications interface 630 may also include one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network). The various components 605-630 of the UE 600 can communicate with each other via a bus 635.

Referring to FIG. 6, the UE 600 may correspond to any type of UE, including but not limited to a smart phone, a laptop computer, a desktop computer, a tablet computer, a wearable device (e.g., a pedometer, a smart watch, etc.) and so on. Two particular implementation examples of the UE 600 are depicted in FIG. 6, which are illustrated as laptop 640 and touchscreen device 655 (e.g., a smart phone, a tablet computer, etc.). The laptop 640 includes a display screen 645 and a UI area 650 (e.g., keyboard, touchpad, power button, etc.), and while not shown the laptop 640 may include various ports as well as wired and/or wireless transceivers (e.g., Ethernet card, WLAN card, broadband card, etc.).

The touchscreen device 655 is configured with a touchscreen display 660, peripheral buttons 665, 670, 675 and 680 (e.g., a power control button, a volume or vibrate control button, an airplane mode toggle button, etc.), and at least one front-panel button 685 (e.g., a Home button, etc.), among other components, as is known in the art. While not shown explicitly as part of the touchscreen device 655, the touchscreen device 655 can include one or more external antennas and/or one or more integrated antennas that are built into the external casing of the touchscreen device 655, including but not limited to WLAN antennas, cellular antennas, satellite position system (SPS) antennas (e.g., global positioning system (GPS) antennas), and so on.

In various embodiments, the UE 600 illustrated in FIG. 6 may correspond to any of the UEs described above, including the UEs 302-1, 302-2 illustrated in FIG. 3, FIGS. 4A-4C, and FIG. 5. Accordingly, the various components of the UE 600 may provide means for performing at least the functions associated with the UEs 302-1, 302-2 illustrated in FIG. 3, FIGS. 4A-4C, and FIG. 5.

Figure 7:
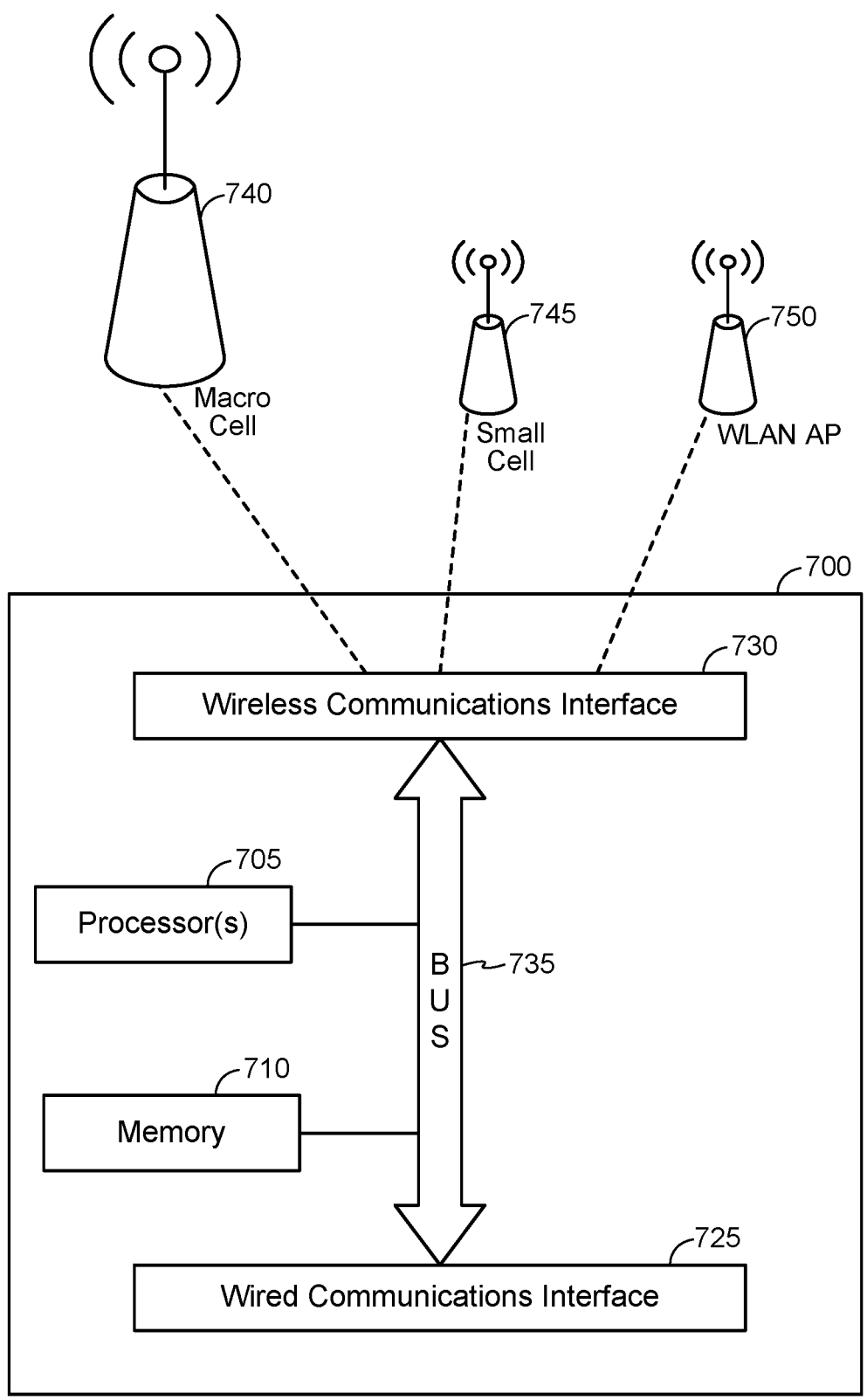
FIG. 7 illustrates an exemplary access point that may be used in accordance with the various aspects and embodiments described herein.

Referring now to FIG. 7, an exemplary access point 700 as illustrated therein may be used in accordance with the various aspects and embodiment described herein. The access point 700 may include one or more processors 705 (e.g., one or more ASICs, one or more DSPs, etc.) and a memory 710 (e.g., RAM, ROM, EEPROM, flash cards, or any memory common to computer platforms). The access point 700 further includes a wired communications interface 725 and a wireless communications interface 730. The various components 705-330 of the access point 700 can communicate with each other via a bus 735.

In an example embodiment, the wired communications interface 725 can be used to connect to one or more backhaul components. Depending on the network infrastructure where the access point is deployed, the one or more backhaul components to which the access point 700 is connected via the wired communications interface 725 may include a base station controller (BSC), a radio network controller (RNC), other access points (e.g., other Node Bs via X2 connections as defined by LTE), core network components such as a serving gateway (S-GW) or a mobility management entity (MME), and so on.

In another example embodiment, the wireless communications interface 730 includes one or more wireless transceivers for communication in accordance with a wireless communications protocol. The wireless communications protocol may be based on the configuration of the access point 700. For example, if the access point 700 is implemented as macro cell 740 or small cell 745 (e.g., a femto cell, a pico cell, etc.), the wireless communications interface 730 may include one or more wireless transceivers configured to implement a cellular protocol (e.g., CDMA, W-CDMA, GSM, 3G, 4G, 5G, etc.). In another example, if the access point 700 is implemented as wireless local area network (WLAN) access point 750, the wireless communications interface 730 may include one or more wireless transceivers configured to implement a Wi-Fi (or 802.11) protocol (e.g., 802.11a, 802.11b, 802.11g, 802.11n, etc.).

In various embodiments, the access point 700 illustrated in FIG. 7 may correspond to any of the access points, base stations, etc. described above, including the eNBs 322-1, 322-2 illustrated in FIG. 3, FIGS. 4A-4C, and FIG. 5. Accordingly, the various components of the access point 700 illustrated in FIG. 7 may provide means for performing at least the functions associated with the eNBs 322-1, 322-2 illustrated in FIG. 3, FIGS. 4A-4C, and FIG. 5.

Figure 8:
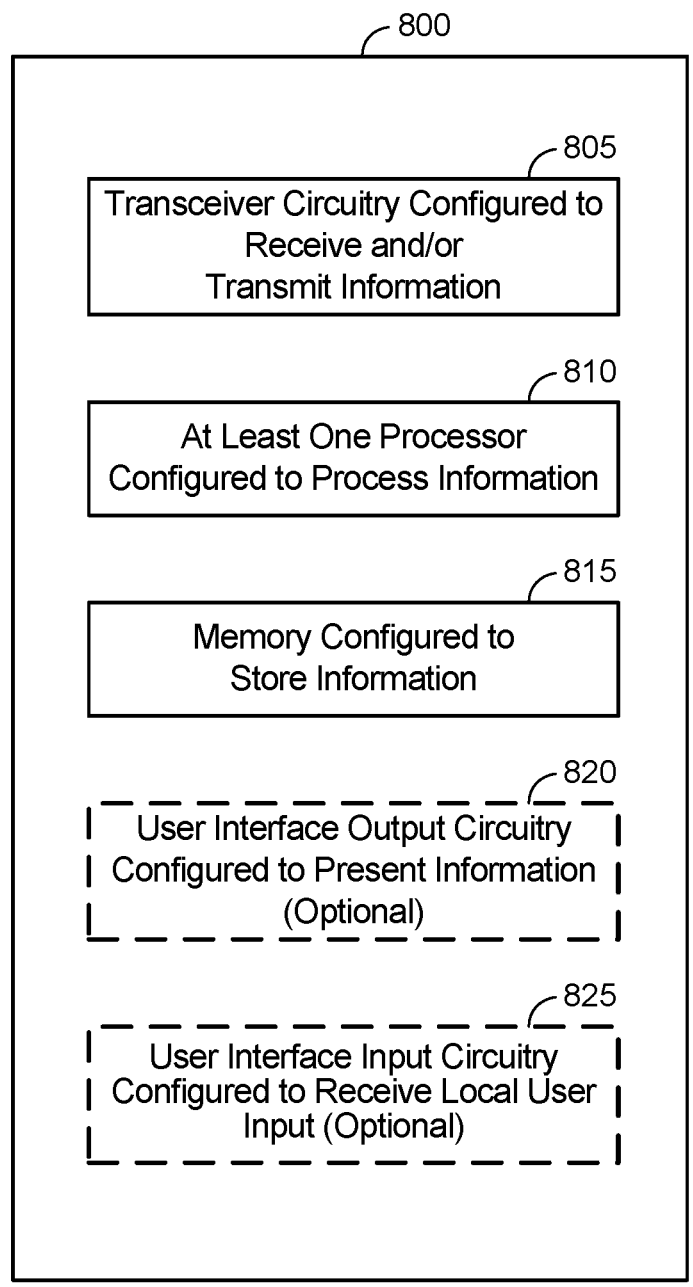
FIG. 8 illustrates an exemplary communications device having various structural components that can be configured to be used in accordance with the various aspects and embodiments described herein.

Referring now to FIG. 8, an exemplary communications device 800 as illustrated therein may include various structural components that can be configured in accordance with the various aspects and embodiment described herein. The communications device 800 can correspond to any of the above-noted communications devices, including but not limited to a UE or an access point, any component included in a RAN such as a base station, an access point, an eNB, a BSC or RNC, a CSCF or PCRF or any other suitable component of a core network, a server or any other component coupled to the Internet, and so on. Thus, communications device 800 can correspond to any electronic device that is configured to communicate with (or facilitate communication with) one or more other entities as described herein.

Referring to FIG. 8, the communications device 800 includes transceiver circuitry configured to receive and/or transmit information 805. In an example, if the communications device 800 corresponds to a wireless communications device such as a UE, the transceiver circuitry configured to receive and/or transmit information 805 can include a wireless communications interface (e.g., Bluetooth, WLAN, Wi-Fi Direct, LTE-Direct, etc.) such as a wireless transceiver and associated hardware (e.g., an RF antenna, a MODEM, a modulator and/or demodulator, etc.). In another example, the transceiver circuitry configured to receive and/or transmit information 805 can correspond to a wired communications interface (e.g., a serial connection, a USB or Firewire connection, an Ethernet connection through which the Internet can be accessed, etc.). Thus, if the communications device 800 corresponds to some type of network-based server, the transceiver circuitry configured to receive and/or transmit information 805 can correspond to an Ethernet card, in an example, that connects the network-based server to other communication entities via an Ethernet protocol. In a further example, the transceiver circuitry configured to receive and/or transmit information 805 can include sensory or measurement hardware by which the communications device 800 can monitor its local environment (e.g., an accelerometer, a temperature sensor, a light sensor, an antenna for monitoring local RF signals, etc.). The transceiver circuitry configured to receive and/or transmit information 805 can also include software that, when executed, permits the associated hardware of the transceiver circuitry configured to receive and/or transmit information 805 to perform its reception and/or transmission function(s). However, the transceiver circuitry configured to receive and/or transmit information 805 does not correspond to software alone, and the transceiver circuitry configured to receive and/or transmit information 805 relies at least in part upon structural hardware to achieve its functionality. Moreover, the transceiver circuitry configured to receive and/or transmit information 805 may be implicated by language other than "receive" and "transmit", so long as the underlying function corresponds to a receive or transmit function. For example, functions such as obtaining, acquiring, retrieving, measuring, etc., may be performed by the transceiver circuitry configured to receive and/or transmit information 805 in certain contexts as being specific types of receive functions. In another example, functions such as sending, delivering, conveying, forwarding, etc., may be performed by the transceiver circuitry configured to receive and/or transmit information 805 in certain contexts as being specific types of transmit functions. Other functions that correspond to other types of receive and/or transmit functions may also be performed by the transceiver circuitry configured to receive and/or transmit information 805.

Referring to FIG. 8, the communications device 800 further includes at least one processor configured to process information 810. Example implementations of the type of processing that can be performed by the at least one processor configured to process information 810 includes but is not limited to performing determinations, establishing connections, making selections between different information options, performing evaluations related to data, interacting with sensors coupled to the communications device 800 to perform measurement operations, converting information from one format to another (e.g., between different protocols such as .wmv to .avi, etc.), and so on. For example, the at least one processor configured to process information 810 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 810 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 810 can also include software that, when executed, permits the associated hardware of the at least one processor configured to process information 810 to perform its processing function(s). However, the at least one processor configured to process information 810 does not correspond to software alone, and the at least one processor configured to process information 810 relies at least in part upon structural hardware to achieve its functionality. Moreover, the at least one processor configured to process information 810 may be implicated by language other than "processing", so long as the underlying function corresponds to a processing function. For example, functions such as evaluating, determining, calculating, identifying, etc., may be performed by the at least one processor configured to process information 810 in certain contexts as being specific types of processing functions. Other functions that correspond to other types of processing functions may also be performed by the at least one processor configured to process information 810.

Referring to FIG. 8, the communications device 800 further includes memory configured to store information 815. In an example, the memory configured to store information 815 can include at least a non-transitory memory and associated hardware (e.g., a memory controller, etc.). For example, the non-transitory memory included in the memory configured to store information 815 can correspond to RAM, flash memory, ROM, erasable programmable ROM (EPROM), EEPROM, registers, hard disk, a removable disk, a CD-ROM, or any other form of storage medium known in the art. The memory configured to store information 815 can also include software that, when executed, permits the associated hardware of the memory configured to store information 815 to perform its storage function(s). However, the memory configured to store information 815 does not correspond to software alone, and the memory configured to store information 815 relies at least in part upon structural hardware to achieve its functionality. Moreover, the memory configured to store information 815 may be implicated by language other than "storing", so long as the underlying function corresponds to a storing function. For example, functions such as caching, maintaining, etc., may be performed by the memory configured to store information 815 in certain contexts as being specific types of storing functions. Other functions that correspond to other types of storing functions may also be performed by the memory configured to store information 815.

Referring to FIG. 8, the communications device 800 further optionally includes user interface output circuitry configured to present information 820. In an example, the user interface output circuitry configured to present information 820 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communications device 800. For example, if the communications device 800 corresponds to the UE 600 as shown in FIG. 6, the user interface output circuitry configured to present information 820 can include a display such as display screen 645 or touchscreen display 660. In a further example, the user interface output circuitry configured to present information 820 can be omitted for certain communications devices, such as network communications devices that do not have a local user (e.g., network switches or routers, remote servers, etc.). The user interface output circuitry configured to present information 820 can also include software that, when executed, permits the associated hardware of the user interface output circuitry configured to present information 820 to perform its presentation function(s). However, the user interface output circuitry configured to present information 820 does not correspond to software alone, and the user interface output circuitry configured to present information 820 relies at least in part upon structural hardware to achieve its functionality. Moreover, the user interface output circuitry configured to present information 820 may be implicated by language other than "presenting", so long as the underlying function corresponds to a presenting function. For example, functions such as displaying, outputting, prompting, conveying, etc., may be performed by the user interface output circuitry configured to present information 820 in certain contexts as being specific types of presenting functions. Other functions that correspond to other types of presenting functions may also be performed by the user interface output circuitry configured to present information 820.

Referring to FIG. 8, the communications device 800 further optionally includes user interface input circuitry configured to receive local user input 825. In an example, the user interface input circuitry configured to receive local user input 825 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communications device 800. For example, if the communications device 800 corresponds to UE 600 as shown in FIG. 6, the user interface input circuitry configured to receive local UI area 650 or touchscreen display 660, etc. In a further example, the user interface input circuitry configured to receive local user input 825 can be omitted for certain communications devices, such as network communications devices that do not have a local user (e.g., network switches or routers, remote servers, etc.). The user interface input circuitry configured to receive local user input 825 can also include software that, when executed, permits the associated hardware of the user interface input circuitry configured to receive local user input 825 to perform its input reception function(s). However, the user interface input circuitry configured to receive local user input 825 does not correspond to software alone, and the user interface input circuitry configured to receive local user input 825 relies at least in part upon structural hardware to achieve its functionality. Moreover, the user interface input circuitry configured to receive local user input 825 may be implicated by language other than "receiving local user input", so long as the underlying function corresponds to a receiving local user input function. For example, functions such as obtaining, receiving, collecting, etc., may be performed by the user interface input circuitry configured to receive local user input 825 in certain contexts as being specific types of receiving local user functions. Other functions that correspond to other types of receiving local user input functions may also be performed by the user interface input circuitry configured to receive local user input 825.

Referring to FIG. 8, while the configured structural components of 805 through 825 are shown as separate or distinct blocks in FIG. 8 that are implicitly coupled to each other via an associated communication bus (not shown expressly), it will be appreciated that the hardware and/or software by which the respective configured structural components of 805 through 825 performs their respective functionality can overlap in part. For example, any software used to facilitate the functionality of the configured structural components of 805 through 825 can be stored in the non-transitory memory associated with the memory configured to store information 815, such that the configured structural components of 805 through 825 each performs their respective functionality (i.e., in this case, software execution) based in part upon the operation of software stored by the memory configured to store information 815. Likewise, hardware that is directly associated with one of the configured structural components of 805 through 825 can be borrowed or used by other of the configured structural components of 805 through 825 from time to time. For example, the at least one processor configured to process information 810 can format data into an appropriate format before being transmitted by the transceiver circuitry configured to receive and/or transmit information 805, such that the transceiver circuitry configured to receive and/or transmit information 805 performs its functionality (i.e., in this case, transmission of data) based in part upon the operation of structural hardware associated with the at least one processor configured to process information 810.

Figure 9:
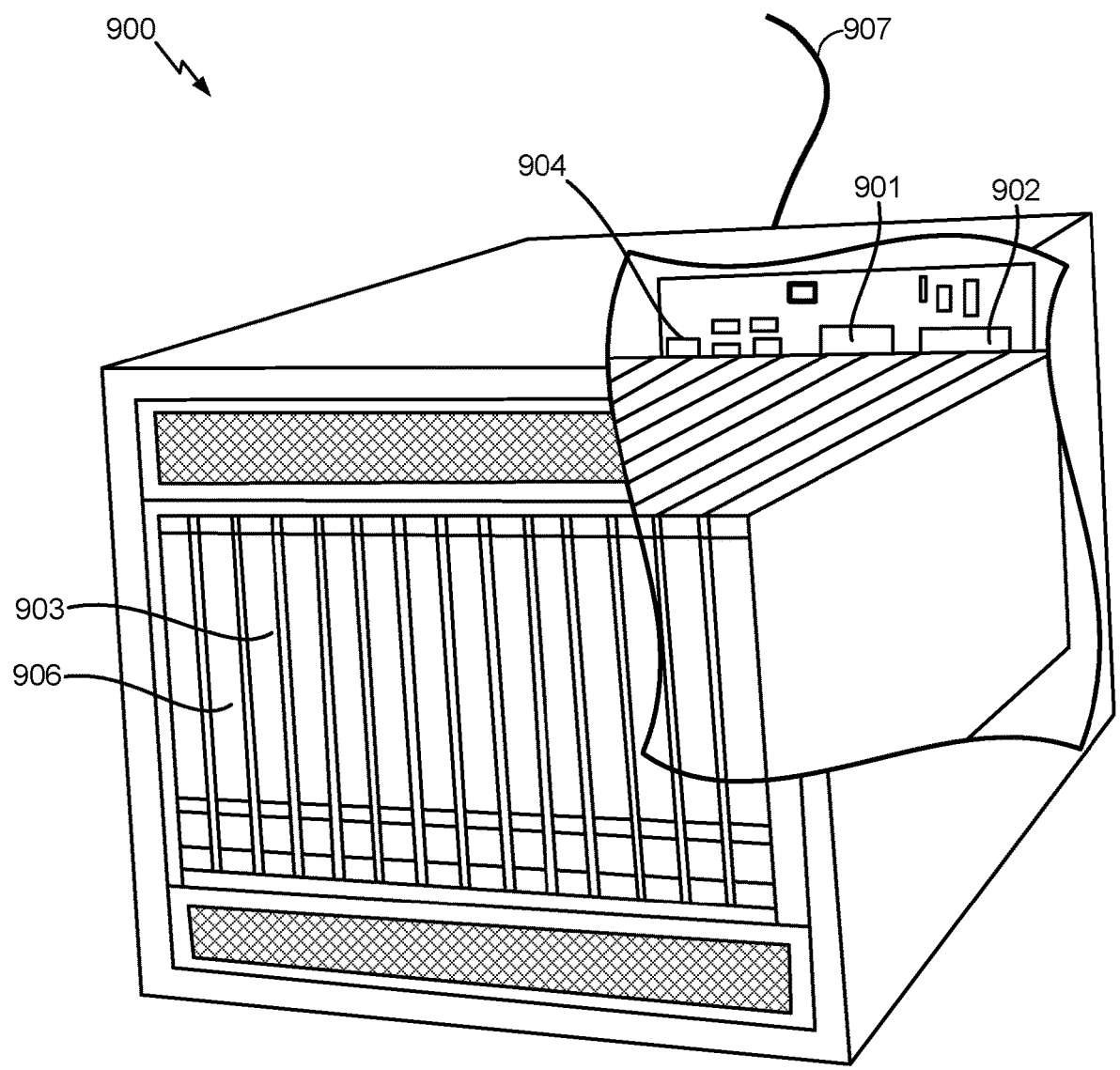
FIG. 9 illustrates an exemplary server that may be configured in accordance with the various aspects and embodiments described herein.

The various aspects and embodiments described herein may be implemented on any of a variety of commercially available server devices, such as server 900 illustrated in FIG. 9. In an example, the server 900 may correspond to one example configuration of the server 170 described above. In FIG. 9, the server 900 includes a processor 901 coupled to volatile memory 902 and a large capacity nonvolatile memory, such as a disk drive 903. The server 900 may also include a floppy disc drive, compact disc (CD) or DVD disc drive 906 coupled to the processor 901. The server 900 may also include network access ports 904 coupled to the processor 901 for establishing data connections with a network 907, such as a local area network coupled to other broadcast system computers and servers or to the Internet. In context with FIG. 8, it will be appreciated that the server 900 of FIG. 9 illustrates one example implementation of the communications device 800, whereby the transceiver circuitry configured to transmit and/or receive information 805 corresponds to the network access ports 904 used by the server 900 to communicate with the network 907, the at least one processor configured to process information 810 corresponds to the processor 901, and the memory configuration to store information 815 corresponds to any combination of the volatile memory 902, the disk drive 903 and/or the disc drive 906. The optional user interface output circuitry configured to present information 820 and the optional user interface input circuitry configured to receive local user input 825 are not shown explicitly in FIG. 9 and may or may not be included therein. Thus, FIG. 9 helps to demonstrate that the communications device 800 illustrated in FIG. 8 may be implemented as a server as shown in FIG. 9 in addition to and/or as an alternative to the UE 600 as in FIG. 6 and/or the access point 700 as in FIG. 7.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for increasing network coverage for a Voice-over-Internet Protocol (VoIP) session between a first user equipment (UE) and a second UE, comprising:
    negotiating, between the first UE and the second UE, a codec configuration to use in the VoIP session between the first UE and the second UE;
    determining, at the first UE, maximum end-to-end packet loss rates (PLRs) that the first UE and the second UE can tolerate for received media based at least in part on the negotiated codec configuration;
    determining, at the first UE, a distribution of the maximum end-to-end PLRs among respective uplinks and downlinks at the first UE and the second UE; and
    transmitting, by the first UE to a serving base station, a message to request an uplink PLR for media transmitted in a direction from the first UE to the second UE and a downlink PLR for media transmitted in a direction from the second UE to the first UE according to the determined distribution.

2. The method recited in claim 1, wherein determining the maximum end-to-end PLRs that the first UE and the second UE can tolerate for received media comprises:
    transmitting, by the first UE to the second UE, the maximum end-to-end PLR that the first UE can tolerate for received media given the negotiated codec configuration; and
    receiving, at the first UE from the second UE, the maximum end-to-end PLR that the second UE can tolerate for received media given the negotiated codec configuration.

3. The method recited in claim 1, wherein the serving base station is configured to establish a handover threshold for the VoIP session based at least in part on the requested uplink PLR and the requested downlink PLR.

4. The method recited in claim 3, wherein the handover threshold comprises a Single Radio Voice Call Continuity (SRVCC) threshold.

5. The method recited in claim 1, wherein the maximum end-to-end PLRs are further based on respective packet loss concealment (PLC) and jitter buffer management (JBM) implementations in use at the first UE and the second UE.

6. The method recited in claim 1, wherein the determined distribution comprises an agreed-upon ratio (R) representing an uplink PLR-to-downlink PLR ratio.

7. The method recited in claim 6, further comprising calculating the uplink PLR and the downlink PLR to request from the serving base station according to the agreed-upon ratio (R) such that:
    the requested uplink PLR is equal to the maximum end-to-end PLR that the second UE can tolerate for received media multiplied by R/(R+1), and
    the requested downlink PLR is equal to the maximum end-to-end PLR that the first UE can tolerate for received media multiplied by 1/(R+1).

8. The method recited in claim 1, wherein the first UE and the second UE are configured to determine the distribution of the maximum end-to-end PLRs among the respective uplinks and downlinks via Session Description Protocol (SDP) such that:
    the uplink PLR requested from the serving base station is less than or equal to a difference between the maximum end-to-end PLR that the second UE can tolerate for received media and a downlink PLR that the second UE requests from a serving base station associated therewith, and the downlink PLR requested from the serving base station is less than or equal to a difference between the maximum end-to-end PLR that the first UE can tolerate for received media and an uplink PLR that the second UE requests from the serving base station associated therewith.

9. The method recited in claim 8, wherein determining the distribution of the maximum end-to-end PLRs among the respective uplinks and downlinks comprises:

transmitting, by the first UE to the second UE, an SDP offer indicating an offeror triad that includes the maximum end-to-end PLR that the first UE can tolerate for received media, a proposed uplink PLR to be requested from the serving base station, and a proposed downlink PLR to be requested from the serving base station; and receiving, at the first UE from the second UE, an SDP answer indicating at least the maximum end-to-end PLR that the second UE can tolerate for received media, wherein the uplink PLR and the downlink PLR requested from the serving base station equal the proposed uplink PLR and the proposed downlink PLR in response to the SDP answer indicating agreement with the offeror triad indicated in the SDP offer.

10. The method recited in claim 9, wherein the SDP answer further indicates a proposed uplink PLR for the second UE that does not fully utilize the maximum end-to-end PLR that the first UE can tolerate for received media when combined with the proposed downlink PLR indicated in the SDP offer.

11. The method recited in claim 9, wherein the SDP answer further indicates a proposed downlink PLR for the second UE that does not fully utilize the maximum end-to-end PLR that the second UE can tolerate for received media when combined with the proposed uplink PLR indicated in the SDP offer.

12. The method recited in claim 8, wherein determining the distribution of the maximum end-to-end PLRs among the respective uplinks and downlinks comprises:

transmitting, by the first UE to the second UE, an SDP offer indicating an offeror triad that includes the maximum end-to-end PLR that the first UE can tolerate for received media, a proposed uplink PLR to be requested from the serving base station, and a proposed downlink PLR to be requested from the serving base station; and receiving, at the first UE from the second UE, an SDP answer indicating values for the proposed uplink PLR and the proposed downlink PLR to be requested from the serving base station, wherein one or more of the values indicated in the SDP answer are modified from the SDP offer to fit within the maximum end-to-end PLR that the second UE can tolerate for received media.

13. The method recited in claim 12, wherein the uplink PLR and the downlink PLR requested from the serving base station equal the values indicated in the SDP answer.

14. The method recited in claim 8, wherein the maximum end-to-end PLRs and maximum possible values for the uplink and downlink PLRs requested from the serving base station are one or more of pre-configured, dynamically configured via Open Mobile Alliance Device Management (OMA-DM) at a device level, or based at least in part on network PLR conditions broadcasted across a cell.

15. The method recited in claim 1, wherein negotiating the codec configuration to use in the VoIP session between the first UE and the second UE comprises:

transmitting, by the first UE, information indicating a most robust codec configuration supported at the first UE, wherein the serving base station is configured to establish a handover threshold for the VoIP session based at least in part on the most robust codec configuration supported at the first UE.

16. The method recited in claim 15, further comprising:

detecting, by the first UE, increased packet loss for the media transmitted in the direction from the second UE to the first UE; and sending, by the first UE to the second UE, a request to adapt capabilities to use one or more of the most robust codec configuration, application layer redundancy, or partial redundancy depending on a bitrate negotiated between the first and second UEs.

17. The method recited in claim 15, further comprising:

receiving, at the first UE, a request to adapt capabilities to use one or more of the most robust codec configuration, application layer redundancy, or partial redundancy depending on a bitrate negotiated between the first and second UEs; and transmitting, by the first UE, media in the direction from the first UE to the second UE according to the adapted capabilities indicated in the request.

18. The method recited in claim 15, further comprising:

detecting, by the first UE, poor network coverage based one or more of a low transmission power headroom or build up in an uplink transmission buffer; and using, by the first UE, the most robust codec configuration supported at the first UE to transmit media in the direction from the first UE to the second UE.

19. An apparatus, comprising:

at least one processor configured to negotiate, with a peer user equipment (UE), a codec configuration to use in a Voice-over-Internet Protocol (VoIP) session with the peer UE, determine maximum end-to-end packet loss rates (PLRs) that the apparatus and the peer UE can tolerate for received media based at least in part on the negotiated codec configuration, and determine a distribution of the maximum end-to-end PLRs among respective uplinks and downlinks at the apparatus and the peer UE; and a transceiver configured to transmit, to a serving base station, a message to request an uplink PLR for media transmitted in a direction from the apparatus to the peer UE and a downlink PLR for media transmitted in a direction from the peer UE to the apparatus according to the determined distribution.

20. The apparatus recited in claim 19, wherein the transceiver is further configured to:

transmit, to the peer UE, the maximum end-to-end PLR that the apparatus can tolerate for received media given the negotiated codec configuration; and receive, from the peer UE, the maximum end-to-end PLR that the peer UE can tolerate for received media given the negotiated codec configuration.

21. The apparatus recited in claim 19, wherein the serving base station is configured to establish a handover threshold for the VoIP session based at least in part on the requested uplink PLR and the requested downlink PLR.

22. The apparatus recited in claim 21, wherein the handover threshold comprises a Single Radio Voice Call Continuity (SRVCC) threshold.

23. The apparatus recited in claim 19, wherein the maximum end-to-end PLRs are further based on respective packet loss concealment (PLC) and jitter buffer management (JBM) implementations in use at the apparatus and the peer UE.

24. The apparatus recited in claim 19, wherein the determined distribution comprises an agreed-upon ratio (R) representing an uplink PLR-to-downlink PLR ratio.

25. The apparatus recited in claim 24, wherein the at least one processor is further configured to calculate the uplink PLR and the downlink PLR to request from the serving base station according to the agreed-upon ratio (R) such that:
   the requested uplink PLR is equal to the maximum end-to-end PLR that the peer UE can tolerate for received media multiplied by R/(R+1), and
   the requested downlink PLR is equal to the maximum end-to-end PLR that the apparatus can tolerate for received media multiplied by 1/(R+1).

26. The apparatus recited in claim 19, wherein the apparatus and the peer UE are configured to determine the distribution of the maximum end-to-end PLRs among the respective uplinks and downlinks via Session Description Protocol (SDP) such that:
   the uplink PLR requested from the serving base station is less than or equal to a difference between the maximum end-to-end PLR that the peer UE can tolerate for received media and a downlink PLR that the peer UE requests from a serving base station associated therewith, and
   the downlink PLR requested from the serving base station is less than or equal to a difference between the maximum end-to-end PLR that the apparatus can tolerate for received media and an uplink PLR that the peer UE requests from the serving base station associated therewith.

27. The apparatus recited in claim 26, wherein the transceiver is further configured to:
   transmit, to the peer UE, an SDP offer indicating an offeror triad that includes the maximum end-to-end PLR that the apparatus can tolerate for received media, a proposed uplink PLR to be requested from the serving base station, and a proposed downlink PLR to be requested from the serving base station; and
   receive, from the peer UE, an SDP answer indicating at least the maximum end-to-end PLR that the peer UE can tolerate for received media, wherein the uplink PLR and the downlink PLR requested from the serving base station equal the proposed uplink PLR and the proposed downlink PLR in response to the SDP answer indicating agreement with the offeror triad indicated in the SDP offer.

28. The apparatus recited in claim 27, wherein the SDP answer further indicates a proposed uplink PLR for the peer UE that does not fully utilize the maximum end-to-end PLR that the apparatus can tolerate for received media when combined with the proposed downlink PLR indicated in the SDP offer.

29. The apparatus recited in claim 27, wherein the SDP answer further indicates a proposed downlink PLR for the peer UE that does not fully utilize the maximum end-to-end PLR that the peer UE can tolerate for received media when combined with the proposed uplink PLR indicated in the SDP offer.

30. The apparatus recited in claim 26, wherein the transceiver is further configured to:
   transmit, to the peer UE, an SDP offer indicating an offeror triad that includes the maximum end-to-end PLR that the apparatus can tolerate for received media, a proposed uplink PLR to be requested from the serving base station, and a proposed downlink PLR to be requested from the serving base station; and
   receive, from the peer UE, an SDP answer indicating values for the proposed uplink PLR and the proposed downlink PLR to be requested from the serving base station, wherein one or more of the values indicated in the SDP answer are modified from the SDP offer to fit within the maximum end-to-end PLR that the peer UE can tolerate for received media.

31. The apparatus recited in claim 30, wherein the uplink PLR and the downlink PLR requested from the serving base station equal the values indicated in the SDP answer.

32. The apparatus recited in claim 26, wherein the maximum end-to-end PLRs and maximum possible values for the uplink and downlink PLRs requested from the serving base station are one or more of pre-configured, dynamically configured via Open Mobile Alliance Device Management (OMA-DM) at a device level, or based at least in part on network PLR conditions broadcasted across a cell.

33. The apparatus recited in claim 19, wherein the transceiver is further configured to:
   transmit, to one or more of the serving base station or the peer UE, information indicating a most robust codec configuration supported at the apparatus, wherein the serving base station is configured to establish a handover threshold for the VoIP session based at least in part on the most robust codec configuration supported at the apparatus.

34. The apparatus recited in claim 33, wherein the transceiver is further configured to:
   send, to the peer UE, a request to adapt capabilities to use one or more of the most robust codec configuration, application layer redundancy, or partial redundancy depending on a bitrate negotiated between the first and peer UEs in response to an increase in packet loss for the media transmitted in the direction from the peer UE to the apparatus.

35. The apparatus recited in claim 33, wherein the transceiver is further configured to:
   receive a request to adapt capabilities to use one or more of the most robust codec configuration, application layer redundancy, or partial redundancy depending on a bitrate negotiated between the first and peer UEs; and
   transmit media in the direction from the apparatus to the peer UE according to the adapted capabilities indicated in the request.

36. The apparatus recited in claim 33, wherein the at least one processor is further configured to:
   detect poor network coverage based one or more of a low transmission power headroom or build up in an uplink transmission buffer; and
   use the most robust codec configuration supported at the apparatus to transmit media in the direction from the apparatus to the peer UE.

37. A method for increasing network coverage for a Voice-over-Internet Protocol (VoIP) session between a first user equipment (UE) and a second UE, comprising:
   monitoring, by a network element serving the first UE, a codec configuration negotiation between the first UE and the second UE, wherein the codec configuration negotiation includes an exchange of maximum end-to-end packet loss rates (PLRs) that the first UE and the second UE can tolerate for received media based at least in part on the negotiated codec configuration;

determining, by the network element, an agreed-upon distribution of the maximum end-to-end PLRs among respective uplinks and downlinks at the first UE and the second UE; and transmitting, by the network element to a base station serving the first UE, a message to request an uplink PLR for media transmitted in a direction from the first UE to the second UE and a downlink PLR for media transmitted in a direction from the second UE to the first UE according to the agreed-upon distribution.

38. The method recited in claim 37, wherein the base station serving the first UE is configured to establish a handover threshold for the VoIP session based at least in part on the requested uplink PLR and the requested downlink PLR.

39. The method recited in claim 38, wherein the handover threshold comprises a Single Radio Voice Call Continuity (SRVCC) threshold.

40. The method recited in claim 37, wherein the maximum end-to-end PLRs are further based on respective packet loss concealment (PLC) and jitter buffer management (JBM) implementations in use at the first UE and the second UE.

41. The method recited in claim 37, wherein the agreed-upon distribution comprises an agreed-upon ratio (R) representing an uplink PLR-to-downlink PLR ratio.

42. The method recited in claim 41, further comprising calculating the uplink PLR and the downlink PLR to request from the serving base station according to the agreed-upon ratio (R) such that:
the requested uplink PLR is equal to the maximum end-to-end PLR that the second UE can tolerate for received media multiplied by R/(R+1), and
the requested downlink PLR is equal to the maximum end-to-end PLR that the first UE can tolerate for received media multiplied by 1/(R+1).

43. The method recited in claim 37, wherein the first UE and the second UE are configured to negotiate the agreed-upon distribution of the maximum end-to-end PLRs among the respective uplinks and downlinks via Session Description Protocol (SDP) such that:
the requested uplink PLR is less than or equal to a difference between the maximum end-to-end PLR that the second UE can tolerate for received media and a downlink PLR that the second UE requests from a serving base station associated therewith, and
the requested downlink PLR is less than or equal to a difference between the maximum end-to-end PLR that the first UE can tolerate for received media and an uplink PLR that the second UE requests from the serving base station associated therewith.

44. The method recited in claim 43, further comprising extracting the uplink PLR and the downlink PLR to request from the base station serving the first UE from an SDP answer that specifies at least the maximum end-to-end PLRs that the first UE and the second UE can tolerate for received media and agreed-upon values for at least one uplink and at least one downlink.

45. The method recited in claim 37, further comprising negotiating the agreed-upon distribution of the maximum end-to-end PLRs among the respective uplinks and downlinks with a network element serving the second UE via Session Description Protocol (SDP).

46. The method recited in claim 45, wherein negotiating the agreed-upon distribution of the maximum end-to-end PLRs comprises:

receiving, at the network element, an SDP offer transmitted by the first UE that indicates the maximum end-to-end PLR that the first UE can tolerate for received media;
determining, at the network element based on operator policy, a proportion of the maximum end-to-end PLR that the first UE can tolerate for received media to allocate to the downlink to the first UE from the base station serving the first UE;
determining, at the network element based on the operator policy, a preferred PLR for the uplink from the first UE to the base station serving the first UE;
modifying, by the network element, the SDP offer to indicate the determined proportion to allocate to the downlink to the first UE and the preferred PLR for the uplink from the first UE; and
transmitting, by the network element, the modified SDP offer to a network element serving the second UE.

47. The method recited in claim 46, wherein negotiating the agreed-upon distribution of the maximum end-to-end PLRs further comprises:
receiving, at the network element, an SDP answer from the network element serving the second UE, wherein the SDP answer includes a proposed uplink PLR for the second UE; and
accepting, by the network element, the SDP answer in response to determining that the proposed uplink PLR for the second UE is less than or equal to a difference between the maximum end-to-end PLR that the first UE can tolerate for received media and the proportion of the maximum end-to-end PLR allocated to the downlink to the first UE.

48. The method recited in claim 46, wherein negotiating the agreed-upon distribution of the maximum end-to-end PLRs further comprises:
receiving, at the network element, an SDP answer from the network element serving the second UE, wherein the SDP answer includes a proposed uplink PLR for the second UE; and
rejecting, by the network element, the SDP answer in response to determining that the proposed uplink PLR for the second UE exceeds a difference between the maximum end-to-end PLR that the first UE can tolerate for received media and the proportion of the maximum end-to-end PLR allocated to the downlink to the first UE.

49. The method recited in claim 45, wherein the agreed-upon distribution of the maximum end-to-end PLRs does not fully utilize one or more of the maximum end-to-end PLRs that the first UE and the second UE can tolerate for received media.

50. An apparatus, comprising:
at least one processor configured to monitor a codec configuration negotiation between a first user equipment (UE) served by the apparatus and a second UE, wherein the codec configuration negotiation includes an exchange of maximum end-to-end packet loss rates (PLRs) that the first UE and the second UE can tolerate for received media based at least in part on the negotiated codec configuration, the at least one processor further configured to determine an agreed-upon distribution of the maximum end-to-end PLRs among respective uplinks and downlinks at the first UE and the second UE; and
a transceiver configured to transmit, to a base station serving the first UE, a message to request an uplink PLR for media transmitted in a direction from the first UE to the second UE and a downlink PLR for media transmitted in a direction from the second UE to the first UE according to the agreed-upon distribution.

51. The apparatus recited in claim 50, wherein the base station serving the first UE is configured to establish a handover threshold for a Voice-over-Internet Protocol (VoIP) session between the first UE and the second UE based at least in part on the requested uplink PLR and the requested downlink PLR.

52. The apparatus recited in claim 51, wherein the handover threshold comprises a Single Radio Voice Call Continuity (SRVCC) threshold.

53. The apparatus recited in claim 50, wherein the maximum end-to-end PLRs are further based on respective packet loss concealment (PLC) and jitter buffer management (JBM) implementations in use at the first UE and the second UE.

54. The apparatus recited in claim 50, wherein the agreed-upon distribution comprises an agreed-upon ratio (R) representing an uplink PLR-to-downlink PLR ratio.

55. The apparatus recited in claim 54, wherein the at least one processor is further configured to calculate the uplink PLR and the downlink PLR to request from the serving base station according to the agreed-upon ratio (R) such that:
   the requested uplink PLR is equal to the maximum end-to-end PLR that the second UE can tolerate for received media multiplied by R/(R+1), and
   the requested downlink PLR is equal to the maximum end-to-end PLR that the first UE can tolerate for received media multiplied by 1/(R+1).

56. The apparatus recited in claim 50, wherein the first UE and the second UE are configured to negotiate the agreed-upon distribution of the maximum end-to-end PLRs among the respective uplinks and downlinks via Session Description Protocol (SDP) such that:
   the requested uplink PLR is less than or equal to a difference between the maximum end-to-end PLR that the second UE can tolerate for received media and a downlink PLR that the second UE requests from a serving base station associated therewith, and
   the requested downlink PLR is less than or equal to a difference between the maximum end-to-end PLR that the first UE can tolerate for received media and an uplink PLR that the second UE requests from the serving base station associated therewith.

57. The apparatus recited in claim 56, wherein the at least one processor is further configured to extract the uplink PLR and the downlink PLR to request from the base station serving the first UE from an SDP answer that specifies at least the maximum end-to-end PLRs that the first UE and the second UE can tolerate for received media and agreed-upon values for at least one uplink and at least one downlink.

58. The apparatus recited in claim 50, wherein the at least one processor is further configured to negotiate the agreed-upon distribution of the maximum end-to-end PLRs among the respective uplinks and downlinks with a network element serving the second UE via Session Description Protocol (SDP).

59. The apparatus recited in claim 58, wherein the at least one processor is further configured to:
   receive, via the transceiver, an SDP offer transmitted by the first UE that indicates the maximum end-to-end PLR that the first UE can tolerate for received media;
   determine, based on operator policy, a proportion of the maximum end-to-end PLR that the first UE can tolerate for received media to allocate to the downlink to the first UE from the base station serving the first UE;
   determine, based on the operator policy, a preferred PLR for the uplink from the first UE to the base station serving the first UE;
   modify the SDP offer to indicate the determined proportion to allocate to the downlink to the first UE and the preferred PLR for the uplink from the first UE; and
   transmit, via the transceiver, the modified SDP offer to a network element serving the second UE.

60. The apparatus recited in claim 59, wherein the at least one processor is further configured to:
   receive, via the transceiver, an SDP answer from the network element serving the second UE, wherein the SDP answer includes a proposed uplink PLR for the second UE; and
   accept the SDP answer in response to the proposed uplink PLR for the second UE being less than or equal to a difference between the maximum end-to-end PLR that the first UE can tolerate for received media and the proportion of the maximum end-to-end PLR allocated to the downlink to the first UE.

61. The apparatus recited in claim 59, wherein the at least one processor is further configured to:
   receive, via the transceiver, an SDP answer from the network element serving the second UE, wherein the SDP answer includes a proposed uplink PLR for the second UE; and
   reject the SDP answer in response to the proposed uplink PLR for the second UE exceeding a difference between the maximum end-to-end PLR that the first UE can tolerate for received media and the proportion of the maximum end-to-end PLR allocated to the downlink to the first UE.

62. The apparatus recited in claim 58, wherein the agreed-upon distribution of the maximum end-to-end PLRs does not fully utilize one or more of the maximum end-to-end PLRs that the first UE and the second UE can tolerate for received media.

* * * * *